United States Patent
Takeda

(10) Patent No.: US 10,704,715 B2
(45) Date of Patent: Jul. 7, 2020

(54) VACUUM PUMPING DEVICE, VACUUM PUMP, AND VACUUM VALVE

(71) Applicant: SHIMADZU CORPORATION, Kyoto (JP)

(72) Inventor: Naoya Takeda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 99 days.

(21) Appl. No.: 15/978,151

(22) Filed: May 13, 2018

(65) Prior Publication Data

US 2018/0340521 A1    Nov. 29, 2018

(30) Foreign Application Priority Data

May 29, 2017 (JP) .................................. 2017-105884
Feb. 16, 2018 (JP) .................................. 2018-026333

(51) Int. Cl.
*F16L 23/036* (2006.01)
*F04B 39/10* (2006.01)
(Continued)

(52) U.S. Cl.
CPC ............ *F16L 23/036* (2013.01); *F04B 39/08* (2013.01); *F04B 39/1066* (2013.01);
(Continued)

(58) Field of Classification Search
CPC .... F04B 9/1256; F04B 39/08; F04B 39/1066; F04B 45/045; F04B 37/14;
(Continued)

(56) References Cited

U.S. PATENT DOCUMENTS 5,577,707 A * 11/1996 Brida ....................... F16K 3/20
                                                        251/159
6,186,749 B1 * 2/2001 Bouille .................. F04D 17/168
                                                        417/295
(Continued)

FOREIGN PATENT DOCUMENTS

EP        1283368 A2 *  2/2003 ............. F04D 19/04
EP        1283368 A2    12/2003
(Continued)

OTHER PUBLICATIONS

Office Action for corresponding CN Application No. 2018105098625 dated Sep. 17, 2019 with English language translation.
(Continued)

*Primary Examiner* — Nathan C Zollinger
(74) *Attorney, Agent, or Firm* — Renner, Otto, Boisselle & Sklar, LLP

(57) ABSTRACT

A vacuum valve comprises a valve suction port flange; a valve exhaust port flange having a greater opening diameter than that of the valve suction port flange; a valve plate; a valve driver configured to slidably drive the valve plate between a closed position and an opening position; and a gas flow path region including an opening of the valve exhaust port flange and having a changing flow path sectional area. In the gas flow path region, a flow path sectional area of an upstream region end is set to an opening sectional area of the valve suction port flange, and increases toward the opening of the valve exhaust port flange.

10 Claims, 16 Drawing Sheets

(51) Int. Cl.
    *F04B 39/08*     (2006.01)
    *F16K 3/02*     (2006.01)
    *F04D 29/60*     (2006.01)
    *F04B 37/14*     (2006.01)
    *F04D 19/04*     (2006.01)
    *F16K 51/02*     (2006.01)

(52) U.S. Cl.
    CPC .......... *F04D 29/601* (2013.01); *F16K 3/0281* (2013.01); *F04B 37/14* (2013.01); *F04D 19/042* (2013.01); *F16K 51/02* (2013.01)

(58) Field of Classification Search
    CPC ........... F04B 2027/1818; F04D 19/042; F04D 27/00; F04D 29/002; F04D 29/601; F16K 3/0281; F16K 3/06; F16K 51/02; F16K 1/18; F16K 1/20; F16L 23/02; F16L 23/036
    See application file for complete search history.

(56) References Cited

U.S. PATENT DOCUMENTS 6,328,051 B1 * 12/2001 Maher ..................... F16K 3/06
                                                                                                                             137/1
6,575,713 B2 * 6/2003 Ohtachi .................. F04D 19/04
                                                                                                                             417/353
7,140,847 B2 * 11/2006 Boger ..................... F04B 37/14
                                                                                                                             417/296
8,434,511 B2 * 5/2013 Williams ................. F16K 3/06
                                                                                                                             137/340
9,970,444 B2 * 5/2018 Bourrilhon ........... F04D 19/042
10,012,316 B2 * 7/2018 Taguchi .................... F16K 3/04
10,578,218 B2 * 3/2020 Taguchi ................ F16K 3/0281
2005/0204754 A1 * 9/2005 Vuillermoz ........... F04D 29/601
                                                                                                                    62/55.5

FOREIGN PATENT DOCUMENTS

| JP | 2008-98514 | | 4/2008 |
| --- | --- | --- | --- |
| JP | 2010135371 | A * | 6/2010 |
| JP | 2010135371 | A | 6/2010 |

OTHER PUBLICATIONS

Office Action for corresponding CN Application No. 2018105098625 dated Mar. 11, 2020.

* cited by examiner

D-D SECTION

E-E SECTION

F-F SECTION

VACUUM PUMPING DEVICE, VACUUM PUMP, AND VACUUM VALVE

BACKGROUND OF THE INVENTION

1. Technical Field

The present invention relates to a vacuum pumping device, a vacuum pump, and a vacuum valve.

2. Background Art

Generally, in a case where a vacuum pump such as a turbo-molecular pump is attached to a vacuum chamber of vacuum equipment, a vacuum valve is often used with the vacuum valve being connected to immediately above the vacuum pump (see, e.g., Patent Literature 1 (JP-A-2008-98514)). A flange configured such that the same opening diameter is applied to a suction side connected to the vacuum chamber and an exhaust side connected to the vacuum pump is generally used as a connection flange of the vacuum valve.

In a vacuum pumping device configured such that a vacuum valve is connected to a suction port flange of a vacuum pump, an effective pumping speed is determined based on the pumping speed of the vacuum pump and the conductance of the vacuum valve. In this case, for the effective pumping speed, contribution of the conductance of the vacuum valve becomes dominant in a region with a small valve opening degree, and contribution of the pumping speed of the vacuum pump becomes dominant in a region with a great valve opening degree. Thus, for increasing the effective pumping speed in the region with a great valve opening degree, a vacuum pump having a greater pumping speed even with the same opening diameter is preferably mounted.

In a substrate processing device described in Patent Literature 1, a turbo-molecular pump configured such that an external cylinder diameter is narrowed in the vicinity of a suction port flange is used as the vacuum pump connected to the exhaust side of the APC valve. Generally, for the turbo-molecular pump configured such that the external cylinder diameter is narrowed in the vicinity of the suction port flange, a rotor blade outer diameter is set greater than that in the case of a turbo-molecular pump configured such that an external cylinder diameter is not narrowed, and a pumping speed is greater by such an increase. That is, the turbo-molecular pump configured such that the external cylinder diameter is narrowed in the vicinity of the suction port flange is used so that the effective pumping speed of the vacuum pumping device can be improved.

However, the turbo-molecular pump configured such that the external cylinder diameter is narrowed has a greater dimension in a pump axial direction than that of the turbo-molecular pump configured such that the external cylinder diameter is not narrowed with the same opening diameter. Thus, there is a problem that the size of the vacuum pumping device is increased.

SUMMARY OF THE INVENTION

A vacuum valve comprises: a valve suction port flange provided at a valve body; a valve exhaust port flange provided at the valve body and having a greater opening diameter than that of the valve suction port flange; a valve plate provided in the valve body and corresponding to the opening diameter of the valve suction port flange; a valve driver configured to slidably drive the valve plate between a closed position at which the valve plate is arranged on a center axis of the valve suction port flange and an opening position at which the valve plate is retracted from the center axis; and a gas flow path region including an opening of the valve exhaust port flange and having a changing flow path sectional area. In the gas flow path region, a flow path sectional area of an upstream region end is set to an opening sectional area of the valve suction port flange, and increases toward the opening of the valve exhaust port flange.

An opening of the valve suction port flange and the opening of the valve exhaust port flange are formed coaxially.

The valve body has a first body portion provided with the valve suction port flange and the valve exhaust port flange, and a second body portion provided with a retraction region of the valve plate at the open position, and a side wall of the first body portion positioned opposite to the second body portion is configured such that a distance from the center axis of the valve suction port flange to the side wall is set to a predetermined value within a range of equal to or greater than ½ of an outer diameter of the valve suction port flange and equal to or less than ½ of an outer diameter of the valve exhaust port flange.

A vacuum pumping device comprises: the vacuum valve; and a vacuum pump configured such that a pump suction port flange is bolted to the valve exhaust port flange.

Multiple bolts for bolting the pump suction port flange to the valve exhaust port flange are unevenly distributed in a predetermined angle region of an entire circumference of the pump suction port flange, and for the pump suction port flange and the valve exhaust port flange, a distance from a flange center axis to a flange outer-diameter-side end portion is set less in other angle regions than the predetermined angle region than in the predetermined angle region.

The valve driver is fixed to the valve body in a vicinity of flange side walls of the pump suction port flange and the valve exhaust port flange in the predetermined angle region.

The vacuum pumping device further comprises: an engagement member having a first engagement portion engaging with the valve exhaust port flange and a second engagement portion engaging with the pump suction port flange, thereby reducing movement of the pump suction port flange in a circumferential direction.

The pump suction port flange has an engagement portion engaging with the valve exhaust port flange to reduce movement of the pump suction port flange in a circumferential direction.

A fitting portion fitting with the valve exhaust port flange to reduce deformation of the pump suction port flange in a radial direction is provided at the pump suction port flange.

The fitting portion is provided in a region of the entire circumference of the pump suction port flange other than the predetermined angle region.

According to the present invention, an increase in the size of the vacuum pumping device can be reduced while the effective pumping speed can be improved.

DETAILED DESCRIPTION OF THE EXEMPLARY EMBODIMENTS

Hereinafter, embodiments of the present invention will be described with reference to the drawings.

First Embodiment

Figure 1:
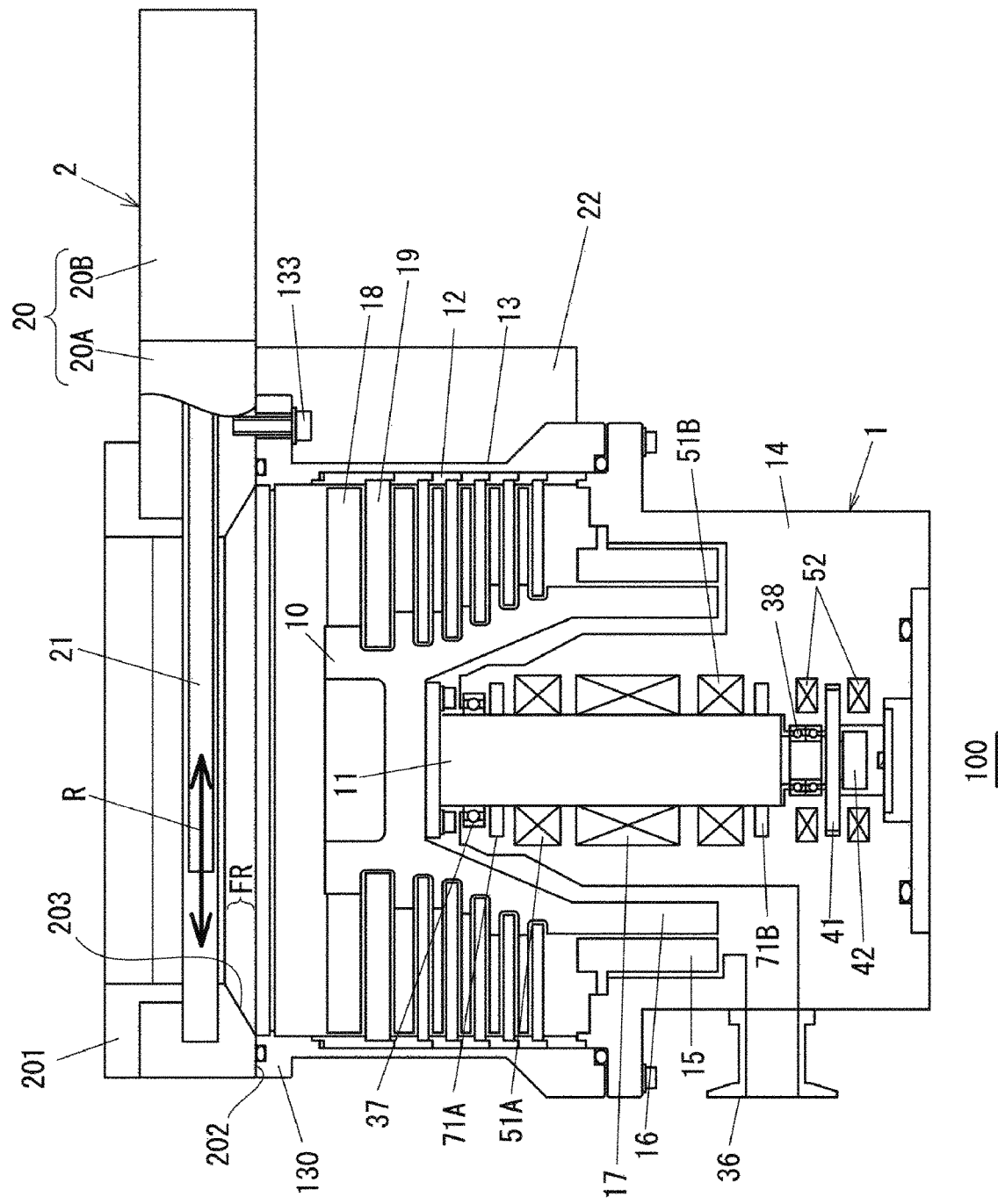
FIG. 1 is a view of an outline configuration of a vacuum pumping device.

FIG. 1 is a view of an outline configuration of a vacuum pumping device 100. The vacuum pumping device 100 includes a vacuum pump 1 and a vacuum valve 2. A suction port flange 130 of the vacuum pump 1 is bolted to an exhaust port flange 202 of the vacuum valve 2.

The vacuum pump 1 illustrated in FIG. 1 is a magnetic bearing turbo-molecular pump, and a shaft 11 attached to a rotor 10 is non-contact supported by magnetic bearings 51A, 51B, 52 provided at a pump base 14. A levitation position of the shaft 11 is detected by radial displacement sensors 71A, 71B and an axial displacement sensor 72 provided at the pump base 14. Note that in a state in which no magnetic bearings are in operation, the shaft 11 is supported by mechanical bearings 37, 38.

A circular rotor disc 41 is provided at a lower end of the shaft 11, and electromagnets of the magnetic bearing 52 are provided to sandwich the rotor disc 41 in an upper-to-lower direction through a clearance. The rotor disc 41 is attracted by the magnetic bearing 52 such that the shaft 11 levitates in an axial direction. The rotor disc 41 is fixed to a lower end portion of the shaft 11 with a nut member 42.

The rotor 10 is provided with multiple rotor blades 18 in a rotation axis direction. A stationary blade 19 is arranged between adjacent ones of the rotor blades 18 arranged in the upper-to-lower direction. These rotor blades 18 and these stationary blades 19 form a turbine blade stage of the vacuum pump 1. The stationary blades 19 are held such that each stationary blade 19 is sandwiched between adjacent ones of spacers 12 in the upper-to-lower direction. The spacers 12 have the function of holding the stationary blades 19, as well as having the function of maintaining a gap between adjacent ones of the stationary blades 19 at a predetermined interval.

A screw stator 15 forming a drag pump stage is provided at a subsequent stage (the lower side as viewed in the figure) of the stationary blades 19, and a gap is formed between an inner peripheral surface of the screw stator 15 and a cylindrical portion 16 of the rotor 10. The rotor 10 and the stationary blades 19 held by the spacers 12 are housed in an external cylinder 13 provided with the suction port flange 130. When the shaft 11 attached to the rotor 10 is rotatably driven by a motor 17 with the shaft 11 being non-contact supported by the magnetic bearings 51A, 51B, 52, gas is exhausted from a suction port flange 130 side to a back pressure side, and the gas exhausted to the back pressure side is discharged by an auxiliary pump (not shown) connected to an exhaust port 36.

The vacuum valve 2 includes a valve body 20, a valve plate 21 provided in the valve body 20, a motor (not shown) configured to drive the valve plate 21, and a motor case 22 housing the motor. The valve plate 21 is slidably driven in the direction of an arrow R by the motor, thereby changing a valve opening degree. The valve body 20 includes a first valve body 20A provided with a suction port flange 201 and the exhaust port flange 202, and a second valve body 20B provided with a retraction region of the slidably-driven valve plate 21. A region indicated by reference characters "FR" in FIG. 1 is a gas flow path region including an opening of the exhaust port flange 202, a flow path sectional area changing in the gas flow path region. A wall surface of the gas flow path region FR is a tapered surface 203.

Figure 2:
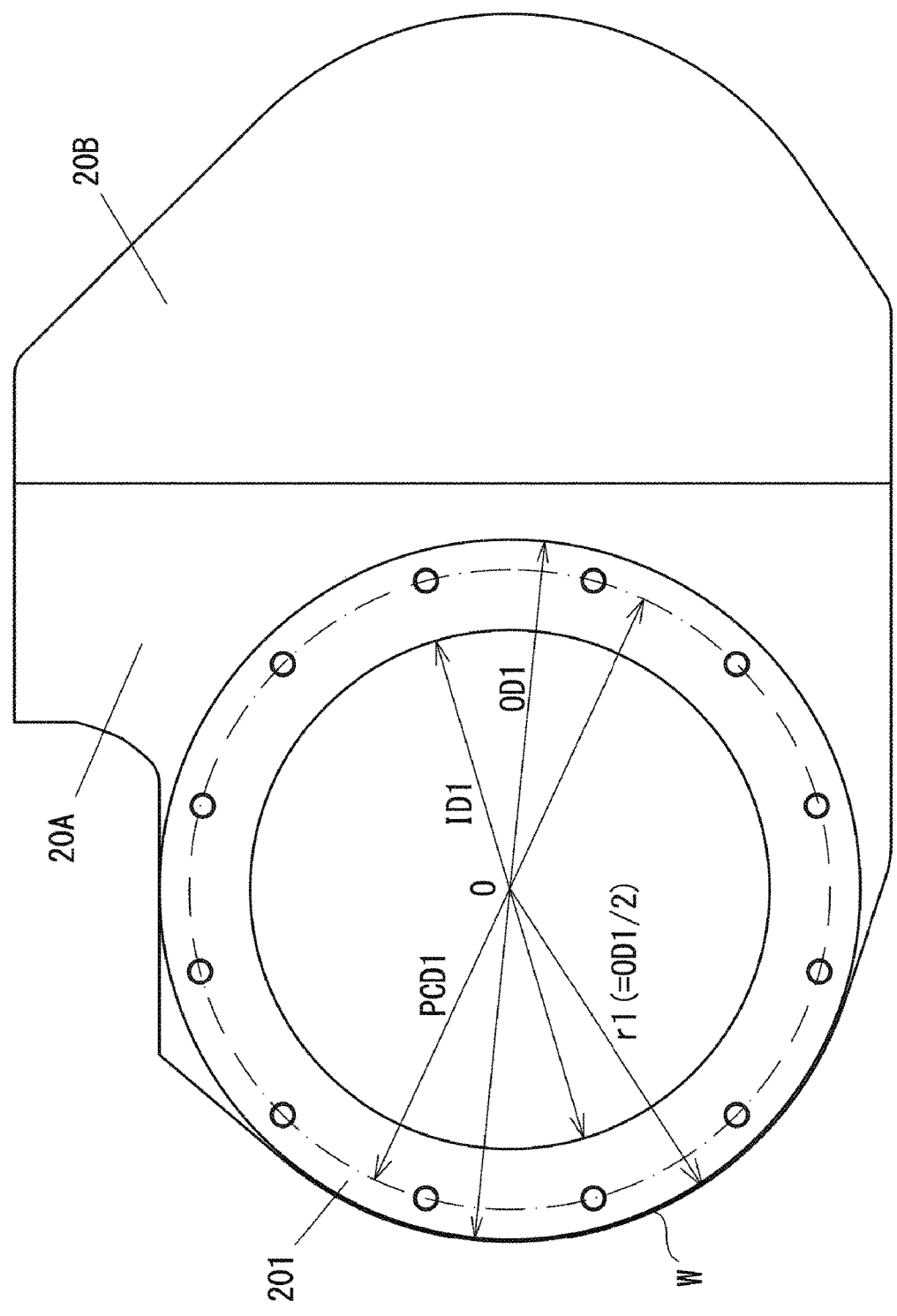
FIG. 2 is a plan view of a suction side of a vacuum valve.
Figure 3:
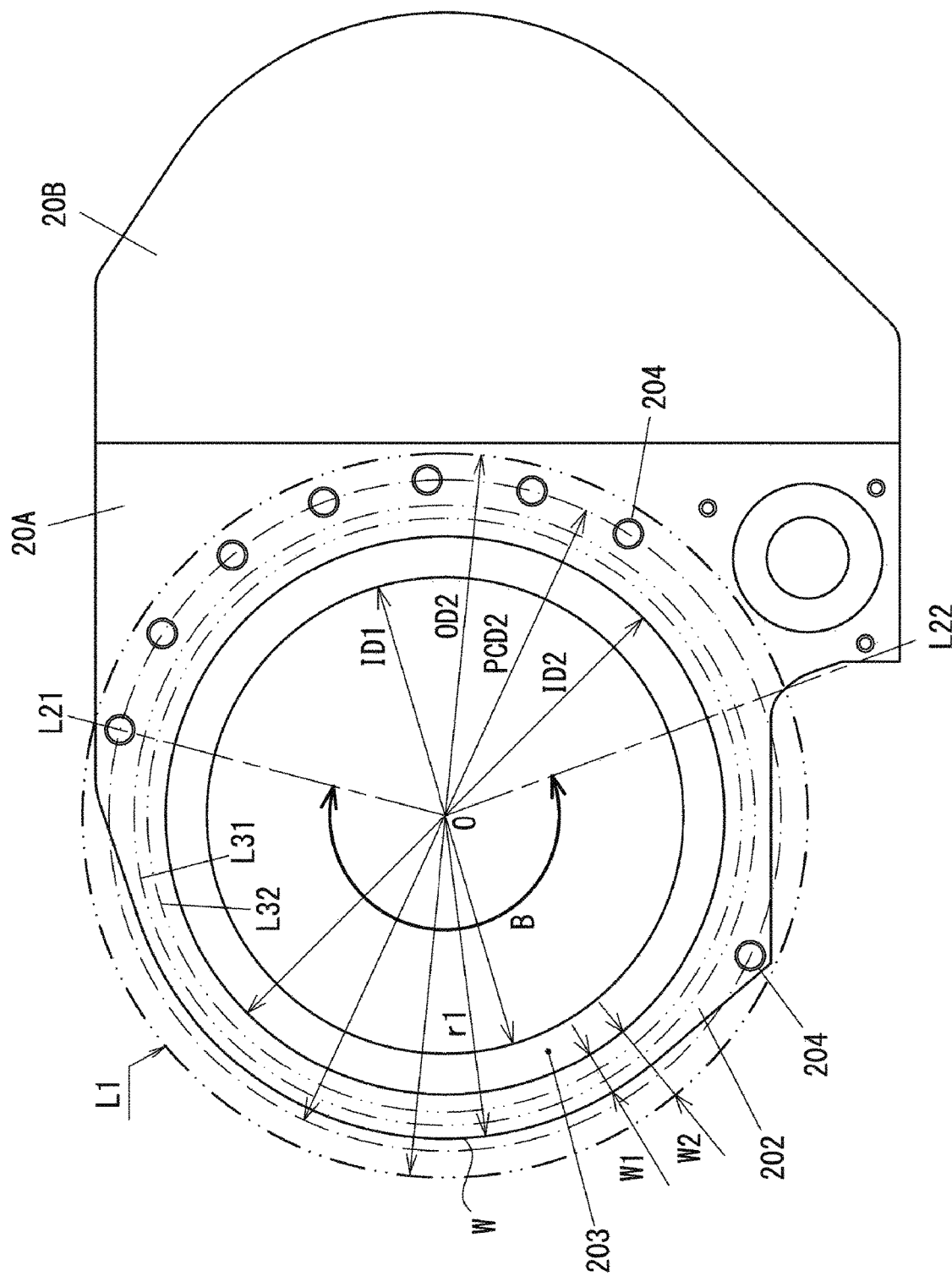
FIG. 3 is a plan view of an exhaust side of the vacuum valve.

FIGS. 2 and 3 are external views of the vacuum valve 2. FIG. 2 is a plan view of a suction side provided with the suction port flange 201. FIG. 3 is a plan view of an exhaust side provided with the exhaust port flange 202. Note that as illustrated in FIG. 1, the opening diameter (the inner diameter) of the exhaust port flange 202 is, in the present embodiment, set greater than that of the suction port flange 201, and an opening of the suction port flange 201 and the opening of the exhaust port flange 202 are formed coaxially.

For example, in a case where the suction port flange 201 has a nominal diameter of 250 according to the JIS standards (B2290), the exhaust port flange 202 is set as a flange with a greater nominal diameter (e.g., a nominal diameter of 300). Note that the flange with a nominal diameter of 250 is also referred to as "VG250" in the case of a groove type, and is also referred to as "VF250" in the case of a raised face type. In description below, the flange with a nominal diameter of 250 will be referred to as a "VG250 flange" or a "VG250 equivalent flange" by means of characters "VG." In addition to the JIS standards (B2290), a vacuum flange according to the ISO standards (1609) may be also used. In this case, the nominal diameter of the exhaust port flange 202 is also greater than that of the suction port flange 201 in the present embodiment.

In FIG. 2, "ID1" and "OD1" are the inner diameter (the opening diameter) and the outer diameter of the suction port flange 201, and "PCD1" is a bolt pitch diameter (a pitch circle diameter). In a case where the suction port flange 201 is VG250, when the suction port flange 201 is fixed to the vacuum-chamber-side flange, 12 M12 bolts are used.

On the other hand, the exhaust-side exhaust port flange 202 illustrated in FIG. 3 is a VG300 equivalent flange. The inner diameter (the opening diameter) ID2 and the bolt pitch diameter PGD2 of the exhaust port flange 202 are set equal to those of the VG300 flange. Note that 12 M12 bolts for flange fixing are used for VG300. However, for the exhaust port flange 202, a screw hole 204 is M16, and the number of screw holes 204, i.e., the number of bolts, is eight. The tapered surface 203 is formed from the flange opening with the inner diameter (the opening diameter) ID2 toward an upstream side of a gas flow path, and the diameter dimension of such an upstream end portion (an upstream region end portion of the gas flow path region FR of FIG. 1) is set equal to the inner diameter (the opening diameter) ID1 of the suction port flange 201. Note that a ring-shaped region surrounded by a chain double-dashed line L31 and a chain double-dashed line L32 forms a seal surface contacting an O-ring seal.

A circle indicated by a chain double-dashed line L1 of FIG. 3 indicates the outer shape of the VG300 flange, and the outer dimension thereof is OD2. The vacuum valve 2 in the first embodiment is equivalent to a vacuum valve configured such that an exhaust port flange of a VG250 equivalent vacuum valve is replaced with the VG300 equivalent exhaust port flange 202, and a valve plate etc. equivalent to those of the VG250 equivalent vacuum valve are used as the valve plate 21 etc. As illustrated in FIGS. 2 and 3, the left region of the first valve body 20A as viewed in the figure is, in the first embodiment, minimized to such an extent that the VG250 equivalent suction port flange 201 can be formed, and the outer shape of the VG300 equivalent exhaust port flange 202 is formed in accordance with the shape of a side wall W of the first valve body 20A. This prevents an increase in the size of the vacuum valve 2.

That is, for minimizing the left region of the first valve body 20A as viewed in the figure to such an extent that the suction port flange 201 can be formed, the side wall W of the first valve body 20A positioned opposite to the second valve body 20B is set such that a distance r1 from a flange center axis O is ½ (i.e., r1=OD1/2) of the outer diameter OD1 of the suction port flange 201. Moreover, as illustrated in FIG. 3, it is configured such that the outer shape of the exhaust port flange 202 is substantially the same as that of the side wall W of the first valve body 20A within an angle range B from a line L21 to a line L22.

As a result, the outer dimension of the first valve body 20A can be held substantially equal to that in the case of VG250 while the opening diameter of the exhaust port flange 202 can be the same as that of VG300 with a greater opening diameter than that of the suction port flange 201. That is, the valve body 20 has such a size that a suction port and the exhaust port are substantially held equal to those of the VG250 vacuum valve while the exhaust port has the same opening diameter as that of VG300. With this configuration, valve conductance and an effective pumping speed of the vacuum pumping device can be improved. Further, a portion with a VG250 equivalent opening diameter and a portion with a VG300 equivalent opening diameter are connected together through the tapered surface 203, and therefore, the effective pumping speed is further improved.

Figure 4A:
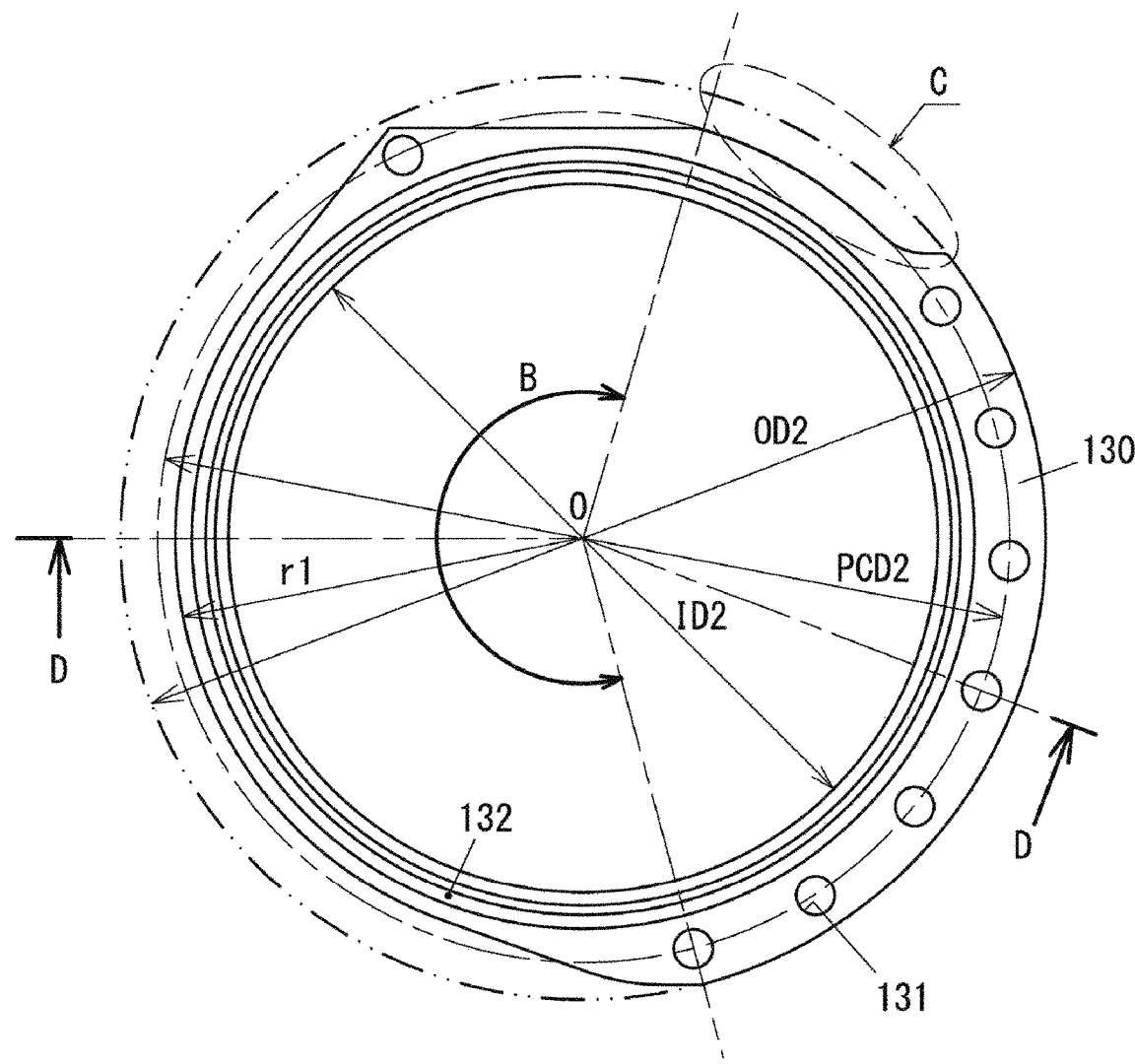
FIGS. 4A and 4B are views of a suction port flange of a vacuum pump.
Figure 4B:
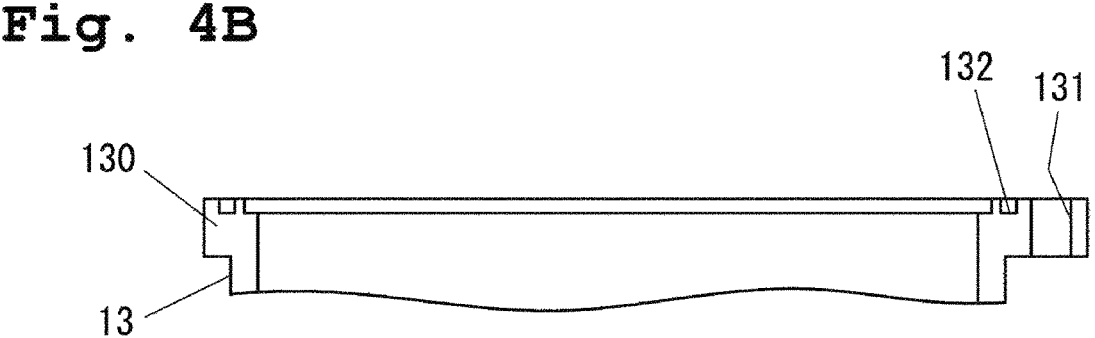

FIGS. 4A and 4B are views of the suction port flange 130 of the vacuum pump 1. FIG. 4A is a plan view of the suction port flange 130, and FIG. 4B is a D-D sectional view. The suction port flange 130 is bolted to the exhaust port flange 202 of the vacuum valve 2 illustrated in FIG. 3. A chain double-dashed line is a line indicating the outer shape of the VG300 flange, and an outer diameter dimension is OD2. The outer shape of the suction port flange 130 is different from a standard shape of the VG300 flange. In the same angle range B as that illustrated in FIG. 3, the distance r1 from the flange center axis O to an outer-diameter-side end portion of the suction port flange 130 is set less than ½ of the outer diameter OD2 of the VG300 flange. Note that in a region indicated by a character "C," a flange outer diameter side is cut out for avoiding contact of the vacuum valve 2 with the motor case 22.

Bolt holes 131 for flange fixing are unevenly distributed in a region with a flange outer diameter margin (i.e., a flange width margin) on the bolt pitch diameter PGD2. In FIGS. 4A and 4B, the bolt holes 131 are formed at a single spot in the angle range B and at seven spots in a region excluding the cutout region C in an area other than the angle range B. The suction port flange 130 is provided with a seal groove 132 for attachment of the O-ring seal.

According to the above-described first embodiment, the following features and advantageous effects are provided.

As illustrated in FIGS. 1 to 3, in the vacuum valve 2, the opening diameter of the exhaust port flange 202 is set greater than that of the suction port flange 201, the gas flow path region FR including the opening of the exhaust port flange 202 and having the changing flow path sectional area is provided, and the wall surface of the gas flow path region FR is formed as the tapered surface 203. The gas flow path region FR is configured such that the flow path sectional area of the upstream region end is set to the opening sectional area (the diameter dimension is ID1) of the suction port flange 201, and the flow path sectional area increases toward the opening of the exhaust port flange 202.

The opening diameter of the exhaust port flange 202 is, as described above, set greater than that of the suction port flange 201 so that the vacuum pump with a greater opening diameter and a higher pumping speed can be attached to the vacuum valve 2. As a result, the effective pumping speed at the suction port of the vacuum valve 2 can be easily improved. Further, the flow path wall surface is formed in a tapered shape from the exhaust port flange 202 to the upstream side so that the conductance from the suction port to the exhaust port can be set greater. Thus, the pumping speed of the vacuum pump with a greater opening diameter can be effectively utilized.

Figure 12:
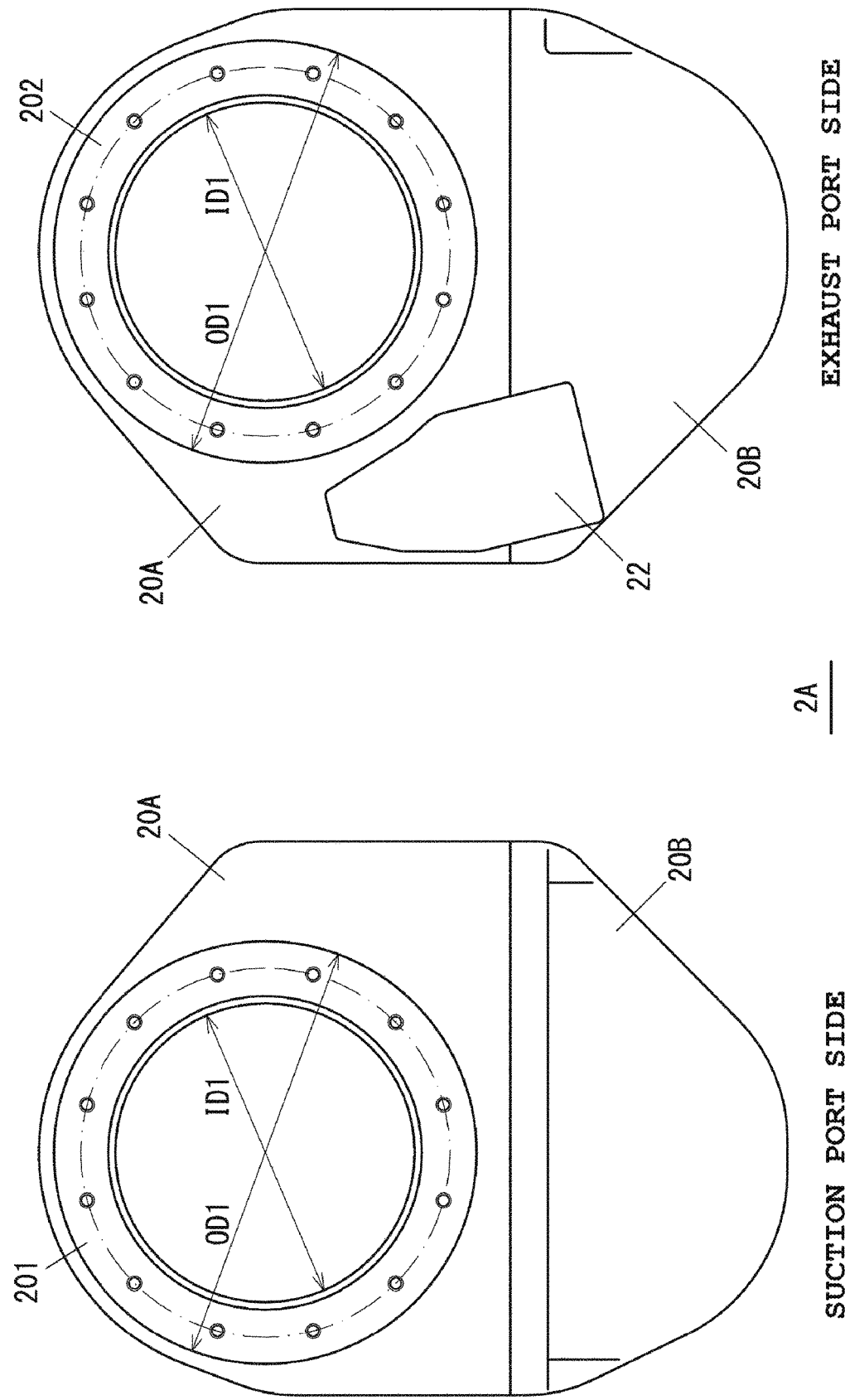
FIG. 12 is a view of an example of the vacuum valve in a case where the same opening diameter is applied to a suction side and an exhaust side.

For example, in a vacuum valve 2A with a VG250 equivalent suction port flange 201 and a VG250 equivalent exhaust port flange 202 as illustrated in FIG. 12, a VG250 equivalent vacuum pump is generally attached to the exhaust port flange 202.

Figure 13:
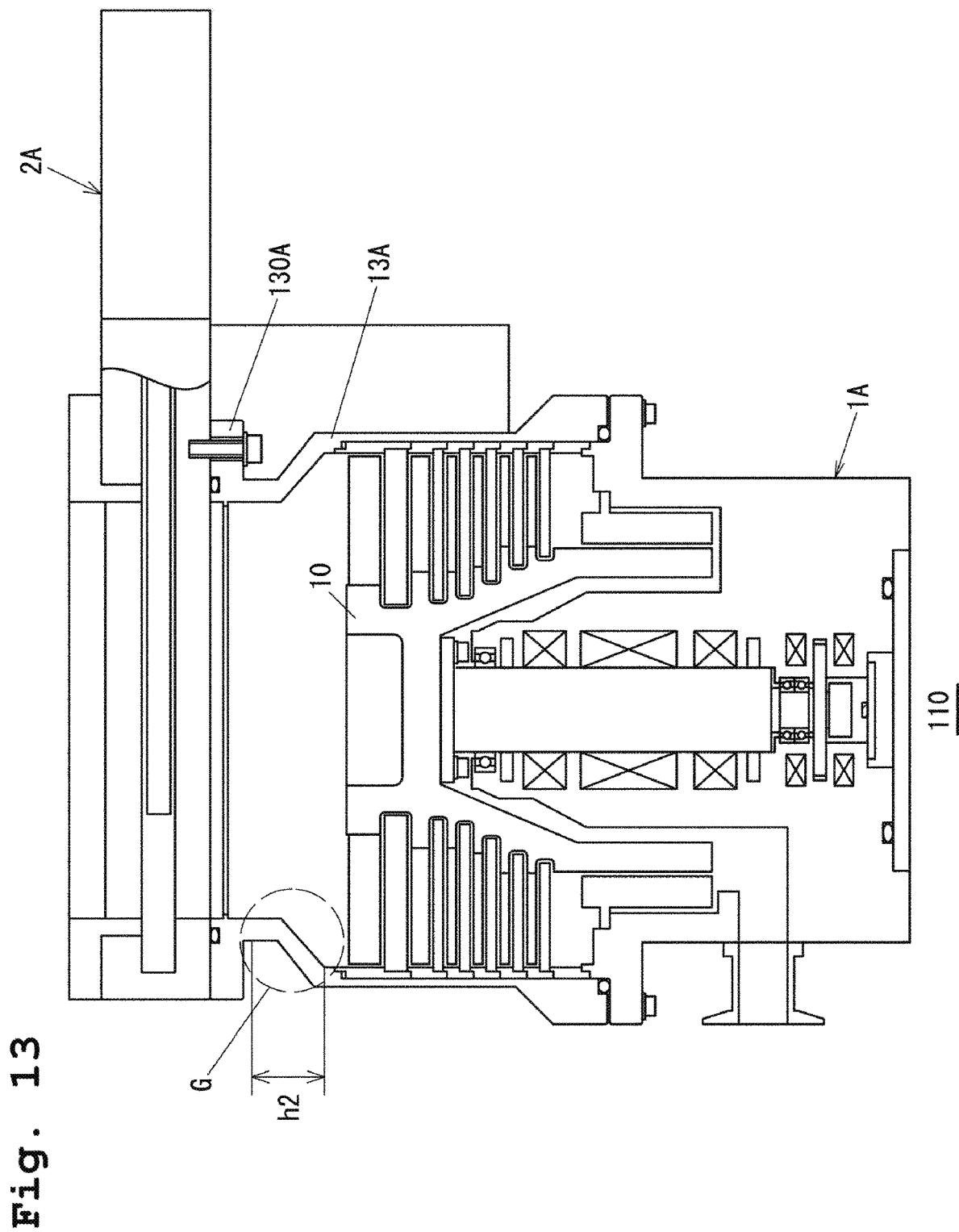
FIG. 13 is a view of a comparative example of the vacuum pumping device.

There are a turbo-molecular pump with a straight external cylinder as illustrated in FIG. 1 and a turbo-molecular pump with an external cylinder having a narrowed neck portion as illustrated in FIG. 13 even when the same opening diameter is applied to pump suction port flanges of these pumps. The rotor diameter of the turbo-molecular pump with the external cylinder having the narrowed neck portion is greater than that of the turbo-molecular pump with the straight external cylinder, and for example, a rotor of a VG300 equivalent pump might be used for a VG250 equivalent pump. Thus, a vacuum pump (a turbo-molecular pump) 1A with an external cylinder having a narrowed neck portion can have a higher pumping speed, and can have a higher pumping speed of a vacuum pumping device 110 as compared to the case of using the vacuum pump (the turbo-molecular pump) 1 having the external cylinder with no narrowed neck portion and having the same opening diameter.

In comparison between the vacuum pump 1A and the vacuum pump 1 of FIG. 1, these pumps are different from each other only in an external cylinder 13A with a suction port flange 130A. The suction port flange 130A of the external cylinder 13A is VG250, and is provided with a narrowed neck portion indicated by a reference character "G." As a result, the vacuum pump 1A has a greater height dimension than that of the vacuum pump 1 by h2.

Meanwhile, the opening diameter of the exhaust port flange 202 is, as in the vacuum valve 2 illustrated in FIGS. 2 and 3, greater than that of the suction port flange 130 so that the vacuum pump having a great opening diameter in a form without the narrowed neck portion of the external cylinder can be used. The vacuum pump 1 has a higher pumping speed than that of the vacuum pump 1A in a form with the narrowed neck portion, and has a smaller height dimension than that of the vacuum pump 1A by h2. As a result, an increase in the size of the vacuum pumping device 100 can be reduced while the effective pumping speed can be improved.

Moreover, the opening of the suction port flange 201 and the opening of the exhaust port flange 202 are formed coaxially so that the conductance can be increased as compared to that in a non-coaxial case.

Further, in the case of forming the vacuum pumping device including the vacuum valve and the vacuum pump, the vacuum pump having a greater opening diameter than that in the case of using a typical vacuum valve configured such that a suction port flange and an exhaust port flange have the same opening diameter can be used, and therefore, the effective pumping speed of the vacuum pumping device can be easily improved.

In addition, as illustrated in FIGS. 1, 3, 4A, and 4B, multiple bolts 133 for bolting the suction port flange 130 of the vacuum pump 1 to the exhaust port flange 202 of the vacuum valve 2 are, as seen from the bolt holes 131 illustrated in FIGS. 4A and 4B, unevenly distributed in a predetermined angle region of the entire circumference of the suction port flange 130.

For example, in an example illustrated in FIGS. 4A and 4B, most of the bolt holes 131 are unevenly distributed within the angle range excluding the angle range B. Thus, in the angle range in which no bolt holes 131 are provided, the distance r1 from the flange center axis O to the flange outer-diameter-side end portion can be less than ½ of the flange outer diameter OD2 in the case of original VG300. In this case, the distance r1 from the flange center axis O on a side close to the side wall W of the (VG300 equivalent) exhaust port flange 202 of the vacuum valve 2 can be substantially the same as ½ of the outer diameter OD1 of the VG250 flange with a smaller opening diameter. Thus, even when the opening of the suction port flange 130 and the opening of the exhaust port flange 202 are set coaxially, an increase in the size of the valve body 20 can be avoided. That is, an increase in the size of the vacuum pumping device can be reduced while the effective pumping speed can be improved.

Second Embodiment

FIGS. 5A and 5B to 8 are views for describing a second embodiment. In the vacuum pump illustrated in FIG. 1, when the rotor 10 rotating at high speed is suddenly stopped, the torque of rotating the suction port flange 130 is generated. As a result, great shear stress acts on the bolts 133 (see FIG. 1) fixing the suction port flange 130. For this reason, in the second embodiment, an engagement member 30 illustrated in FIGS. 5A and 5B engages with both of a suction port flange 130 and an exhaust port flange 202, and therefore, a load generated upon sudden stop is not only on bolts 133 but also on the engagement member 30.

Figure 5A:
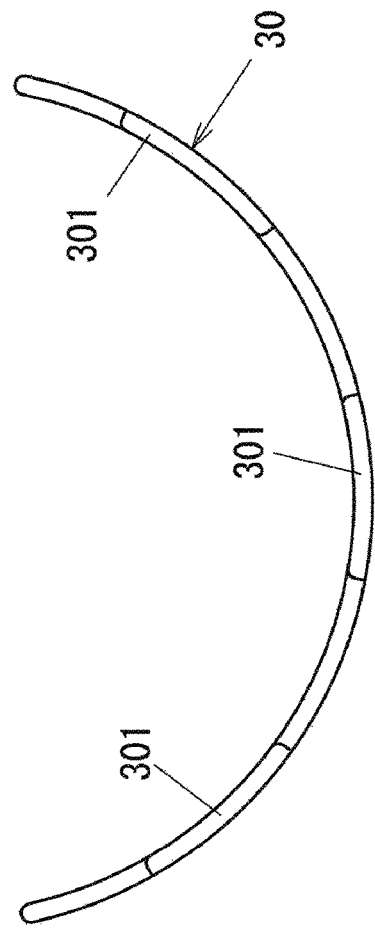
FIGS. 5A and 5B are views of an example of an engagement member.
Figure 5B:
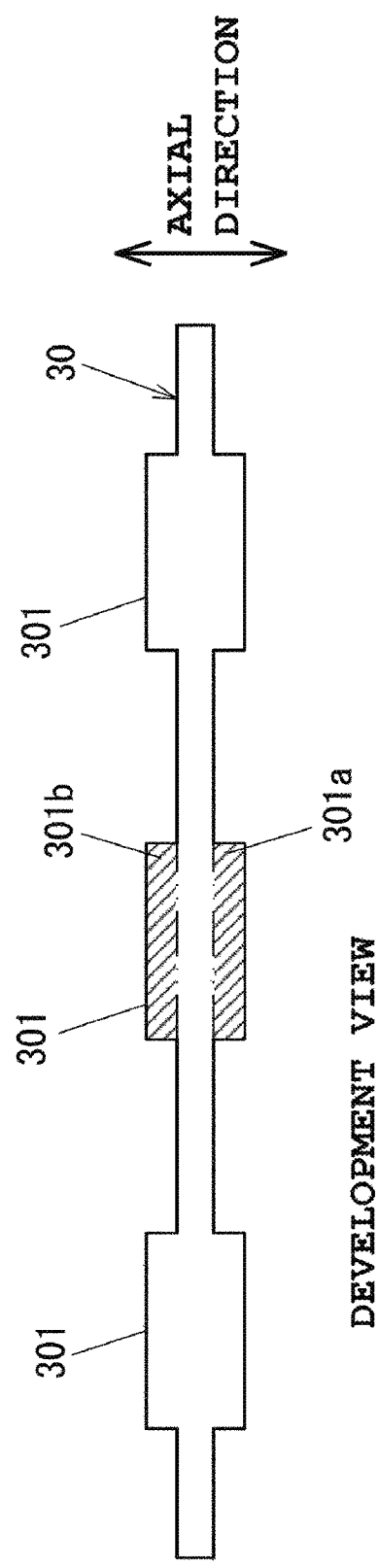

FIGS. 5A and 5B are views of an example of the engagement member 30. FIG. 5A is a view of the engagement member 30 from the direction of the exhaust port flange 202, and FIG. 5B is a development view of the engagement member 30 from a lateral side. The engagement member 30 is an arc band-shaped member, and is provided with multiple wide engagement regions 301. Each engagement region 301 has a first engagement portion 301a protruding to one side in an axial direction, and a second engagement portion 301b protruding to the other side in the axial direction. As described later, the first engagement portion 301a engages with a portion of the suction port flange 130 of a vacuum pump 1, and the second engagement portion 301b engages with a portion of the exhaust port flange 202 of a vacuum valve 2.

Figure 6A:
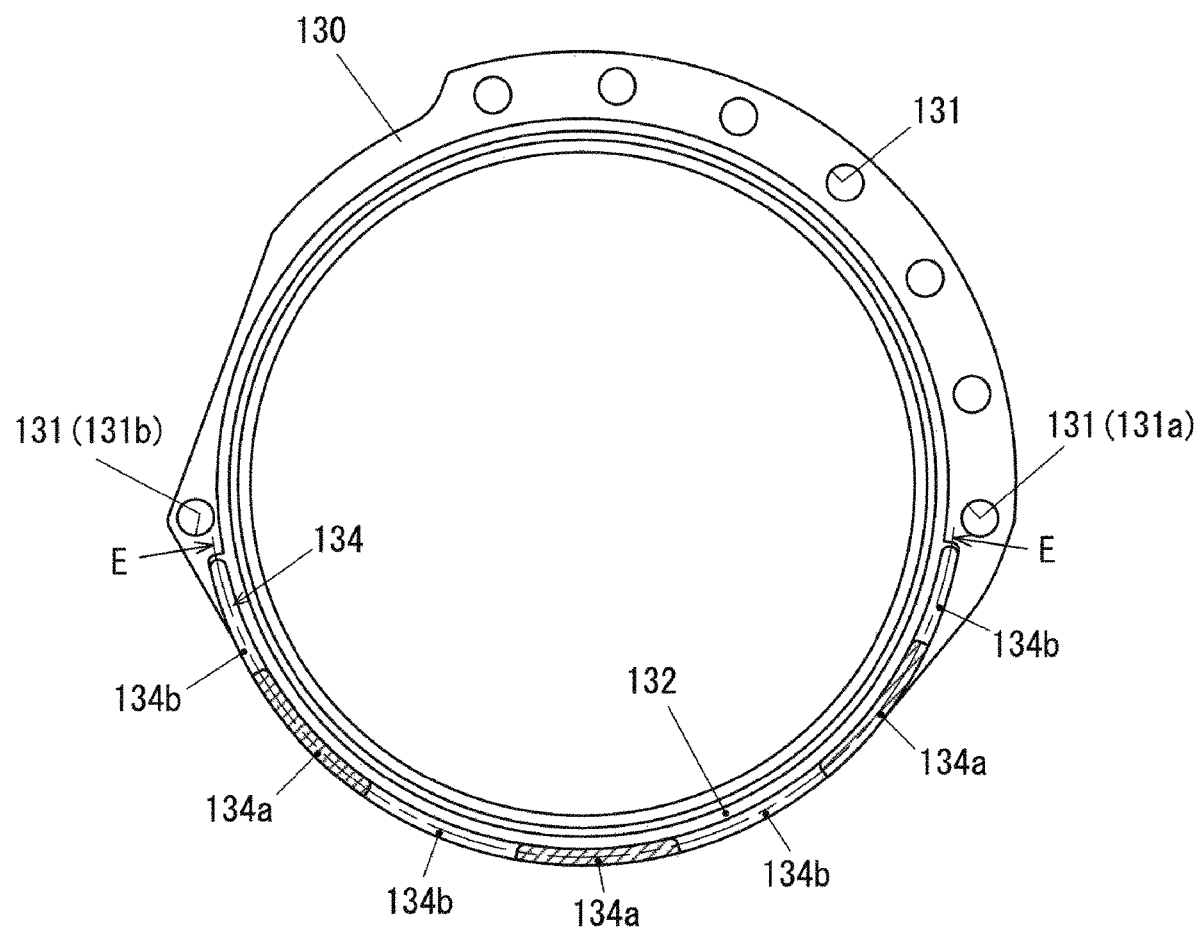
FIGS. 6A and 6B are views of a suction port flange of a vacuum pump in a second embodiment.
Figure 6B:
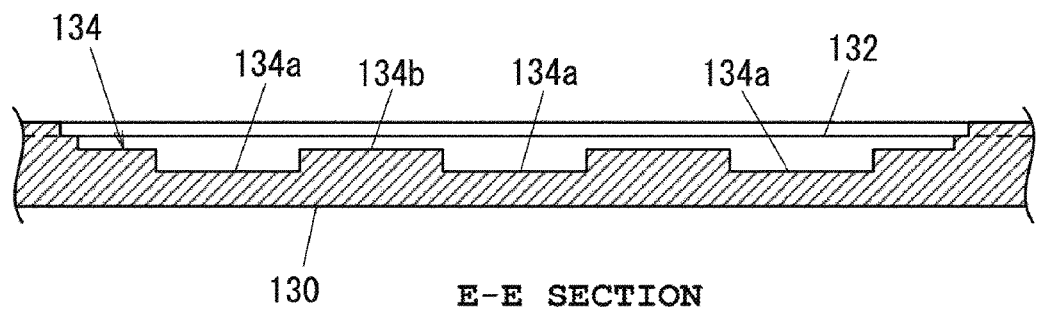

FIGS. 6A and 6B are views of the suction port flange 130 of the vacuum pump 1 in the second embodiment. FIG. 6A is a plan view, and FIG. 6B is an E-E sectional view. A groove 134 to be attached to the engagement member 30 illustrated in FIGS. 5A and 5B is formed at a surface of the suction port flange 130 provided with a seal groove 132. In an example illustrated in FIGS. 6A and 6B, the groove 134 is formed in a region between a bolt hole 131a and a bolt hole 131b. The groove 134 includes first groove portions 134a with a greater depth, and second groove portions 134b with a smaller depth. The engagement regions 301 of the engagement member 30 are each arranged in the first groove portions 134a, and narrow portions of the engagement member 30 are each arranged on the second groove portions 134b.

Figure 7:
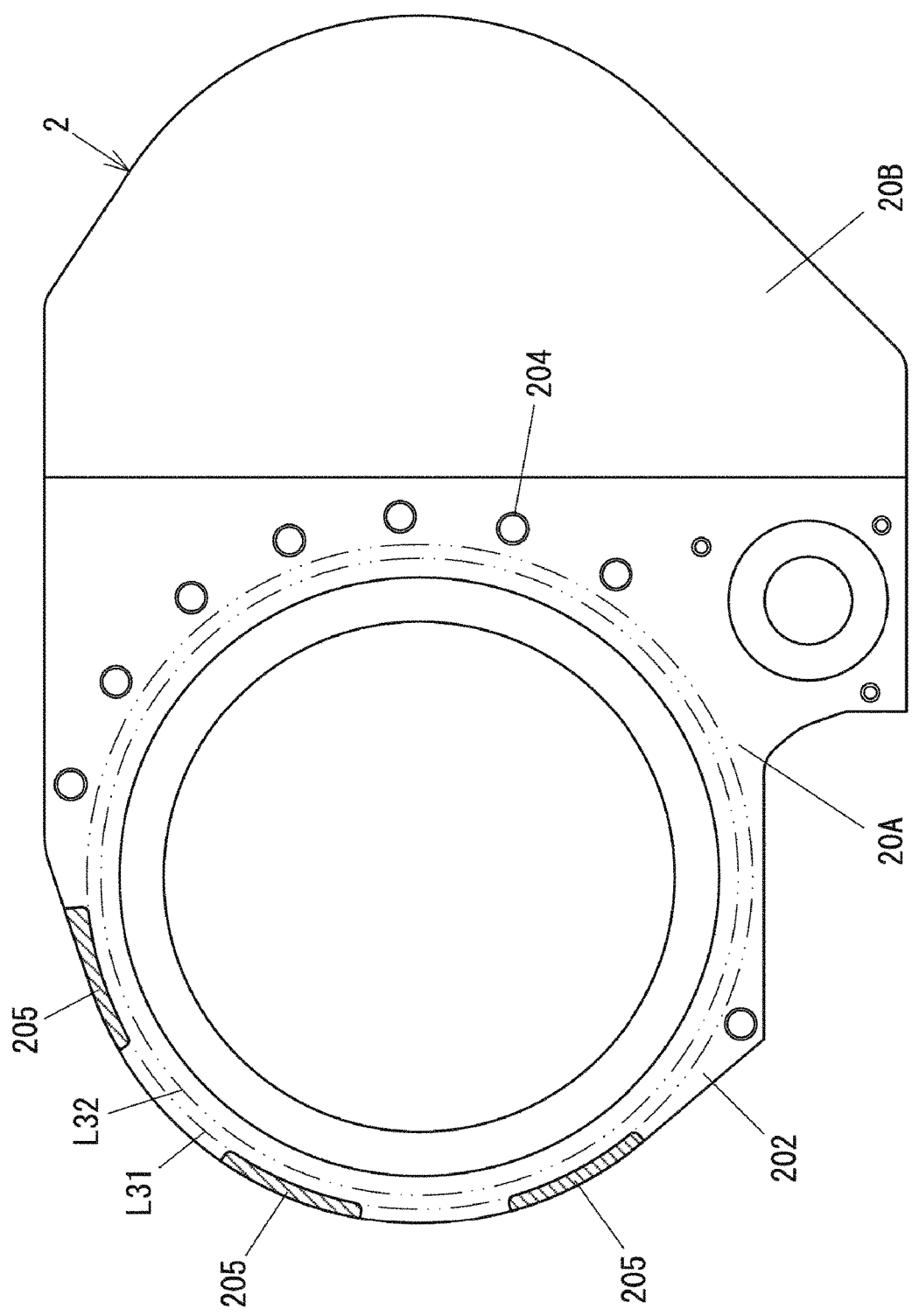
FIG. 7 is a plan view of an exhaust side of a vacuum valve in the second embodiment.

FIG. 7 is a view of the exhaust port flange 202 of the vacuum valve 2. At the exhaust port flange 202, recessed portions 205 are each formed at positions facing the first groove portions 134a of the suction port flange 130 illustrated in FIGS. 6A and 6B. A ring-shaped region surrounded by a chain double-dashed line L31 and a chain double-dashed line L32 forms a seal surface contacting an O-ring seal.

Figure 8:
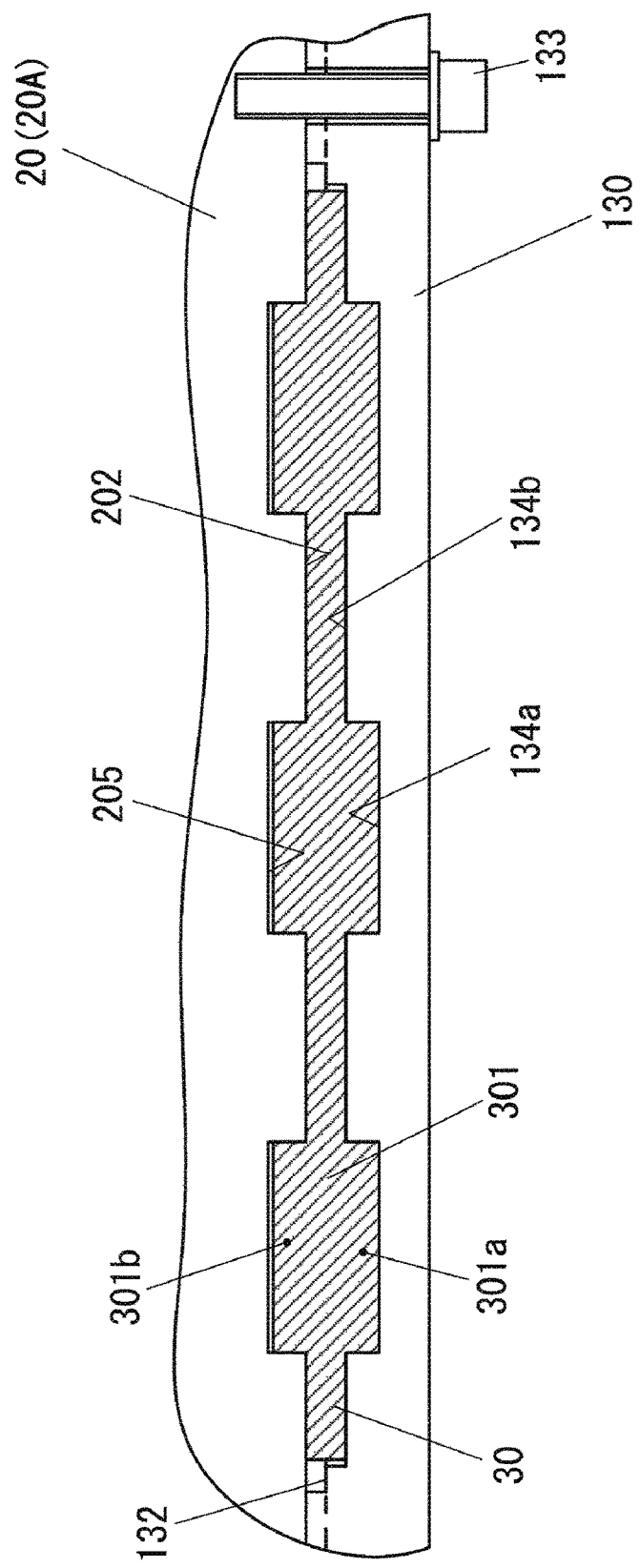
FIG. 8 is a view of an attachment state of an engagement member.

FIG. 8 is a sectional view of the suction port flange 130 and the exhaust port flange 202 bolted together and the engagement member 30 attached therebetween. When the suction port flange 130 and the exhaust port flange 202 are connected together, the first groove portions 134a of the suction port flange 130 each face the recessed portions 205 of the exhaust port flange 202, and therefore, a space for housing the engagement regions 301 of the engagement member 30 is formed. In a state in which the engagement member 30 is attached, the first engagement portions 301a of the engagement regions 301 each engage with the first groove portions 134a of the suction port flange 130, and the second engagement portions 301b of the engagement regions 301 each engage with the recessed portions 205 of the exhaust port flange 202. Moreover, each narrow portion (i.e., other portions than the engagement regions 301) of the engagement member 30 is arranged in a space among the second groove portions 134b of the suction port flange 130 and a flange surface of the exhaust port flange 202.

(Variations)

Figure 9A:
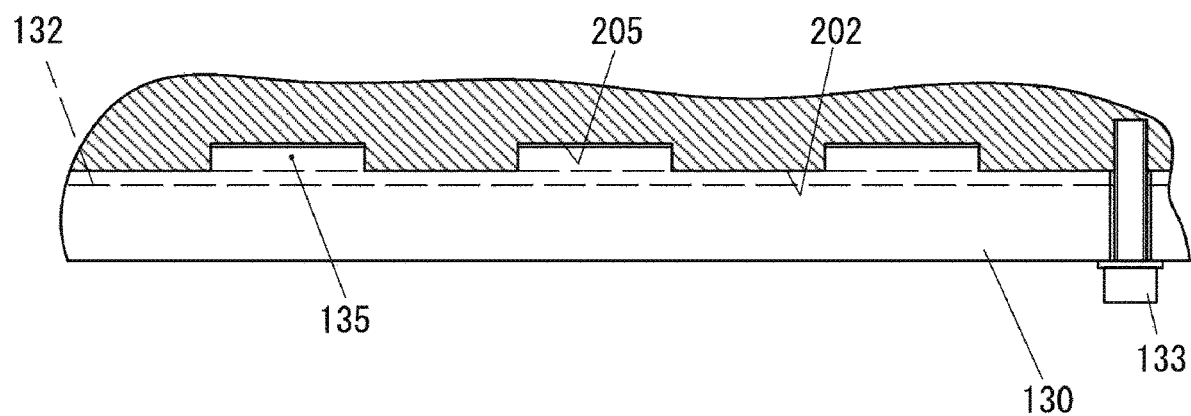
FIGS. 9A and 9B are views of variations of the second embodiment.
Figure 9B:
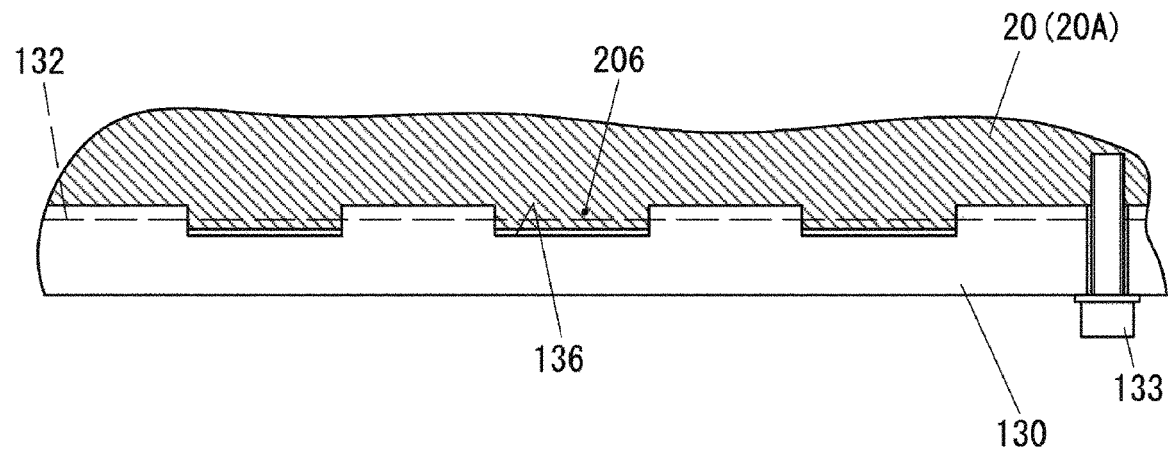

FIGS. 9A and 9B are views of variations of the second embodiment. In the above-described second embodiment, the engagement member 30 is provided as a separate member, and the suction port flange 130 and the exhaust port flange 202 engage with each other through the engagement member 30. In the variations, the engagement member 30 is integrated with one of the suction port flange 130 or the exhaust port flange 202.

A configuration illustrated in FIG. 9A corresponds to a case where the engagement member 30 is integrated with the suction port flange 130. That is, each raised portion 135 engaging with a corresponding one of the recessed portions 205 of the exhaust port flange 202 is formed to protrude from a flange surface of the suction port flange 130. On the other hand, a configuration illustrated in FIG. 9B is a case where the engagement member 30 is integrated with the exhaust port flange 202. In this case, recessed portions 136 are formed at the flange surface of the suction port flange 130, and raised portions 206 each engaging with the recessed portions 136 are formed at the flange surface of the exhaust port flange 202. The raised portions 206 are formed to protrude from the flange surface of the exhaust port flange 202.

According to the above-described second embodiment, the following features and advantageous effects are provided in addition to the features and the advantageous effects in the first embodiment.

As illustrated in FIG. 8, the engagement member 30 has the first engagement portions 301a engaging with the suction port flange 130 of the vacuum pump 1, and the second engagement portions 301b engaging with the exhaust port flange 202 of the vacuum valve 2. With this configuration, the engagement member 30 reduces movement of the suction port flange 130 in a circumferential direction. As a result, the torque generated upon rotor sudden stop is received not only by the bolts 133 but also by the portion of the exhaust port flange 202 engaging with the engagement member 30, and therefore, the shear stress on the bolts 133 can be reduced.

Moreover, as illustrated in FIGS. 9A and 9B, the raised portions 135 (FIG. 9A) or the recessed portions 136 as engagement portions engaging with the exhaust port flange 202 of the vacuum valve 2 are provided at the suction port flange 130 of the vacuum pump 1, thereby reducing movement of the suction port flange 130 in the circumferential direction. This also can reduce the shear stress on the bolts 133.

Third Embodiment

In the above-described second embodiment, part of the load in the circumferential direction upon sudden stop of the rotor 10 of the vacuum pump 1 is received by the engagement portions so that the shear stress on the bolts for flange fixing can be reduced. In a case where the rotor 10 rotating at high speed is broken, a broken rotor piece comes into collision with the external cylinder 13 or the suction port flange 130 of the vacuum pump, and the external cylinder 13 or the suction port flange 130 might greatly deform in a radial direction due to motion energy of the broken rotor piece. In a third embodiment, the configuration for reducing deformation of the external cylinder 13 or the suction port flange 130 in such a case is provided.

Figure 10A:
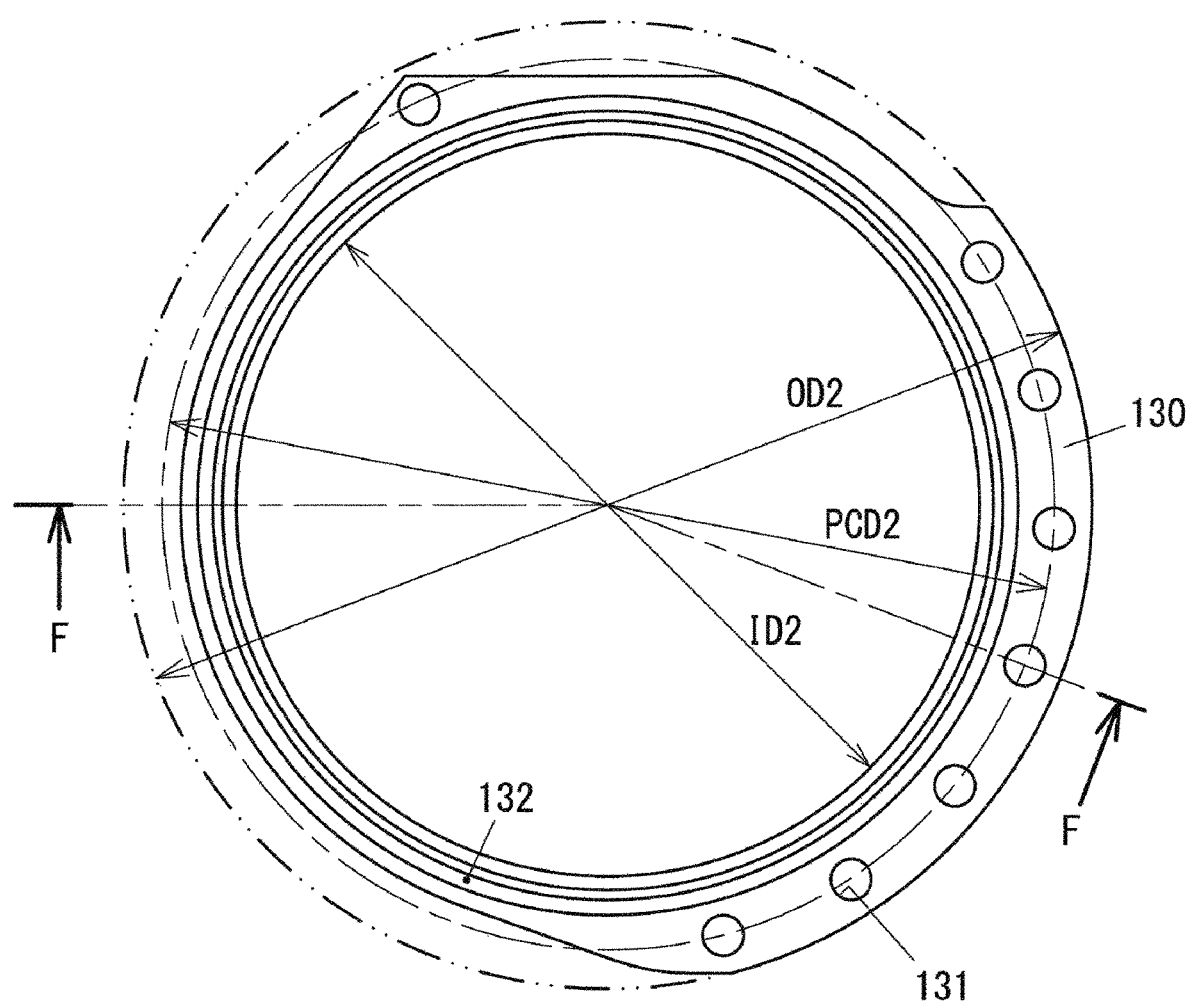
FIGS. 10A and 10B are views of a suction port flange of a vacuum pump in a third embodiment.
Figure 10B:
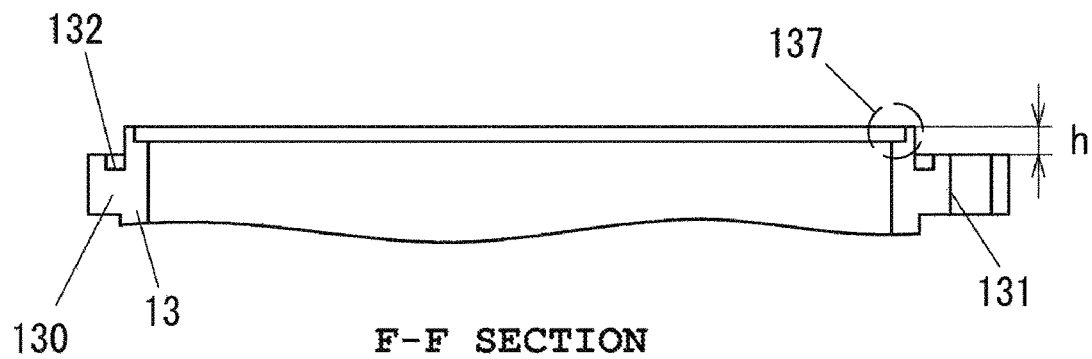
Figure 11:
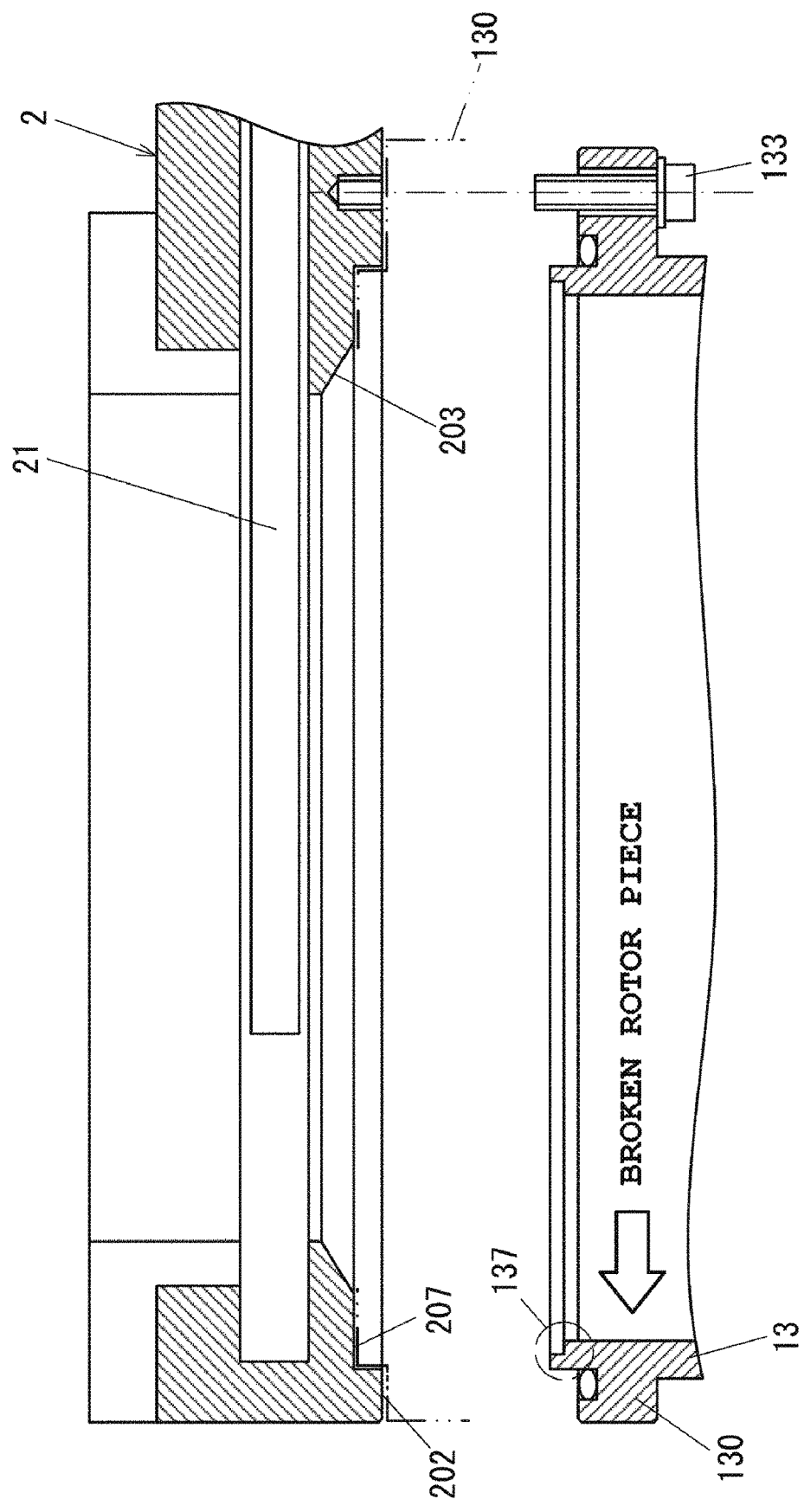
FIG. 11 is a view for describing the form of connection between the vacuum pump and a vacuum valve in the third embodiment.

FIGS. 10A, 10B, and 11 are views for describing the third embodiment. FIGS. 10A and 10B are views of a suction port flange 130 of a vacuum pump 1, FIG. 10A being a plan view and FIG. 10B being an F-F sectional view. In comparison with the suction port flange 130 illustrated in FIGS. 4A and 4B, the suction port flange 130 illustrated in FIGS. 10A and 10B is different in that a raised portion 137 protruding from a flange surface of the suction port flange 130 is provided. The raised portion 137 protrudes from the flange surface by a dimension h.

FIG. 11 is a view for describing the configuration of a connection portion between the suction port flange 130 and an exhaust port flange 202 in the third embodiment, and the suction port flange 130 is the same as that illustrated in FIGS. 10A and 10B. A circular recessed portion 207 is formed at a flange surface of the exhaust port flange 202. When the suction port flange 130 is connected to the exhaust port flange 202 as indicated by a chain double-dashed line, the raised portion 137 is fitted in the recessed portion 207.

According to the above-described third embodiment, the following features and advantageous effects are provided in addition to the features and the advantageous effects in the first embodiment. As illustrated in FIG. 11, the raised portion 137 fitted in the recessed portion 207 of the exhaust port flange 202 of a vacuum valve 2 to reduce deformation of the suction port flange 130 of the vacuum pump 1 in the radial direction is provided at the suction port flange 130, and therefore, outward deformation of the external cylinder 13 or the suction port flange 130 in the radial direction due to impact of broken rotor piece collision can be reduced.

In the vacuum pump 1, even in a case where the rotor 10 rotating at high speed is broken, the broken rotor piece is preferably avoided from coming out of the external cylinder 13. The broken rotor piece is scattered in the radial direction due to the centrifugal force, and then, comes into collision with the external cylinder 13. Due to collision impact, the external cylinder 13 or the suction port flange 130 tends to deform outward in the radial direction. Specifically, in the case of the suction port flange 130 illustrated in FIGS. 4A and 4B, the region to be bolted is unevenly placed at part of the entire circumference, and therefore, the external cylinder 13 and the suction port flange 130 tend to more deform due to impact in the radial direction at the region with no bolts than at the region with the bolts.

However, in the present embodiment, the raised portion 137 is fitted in the recessed portion 207 of the exhaust port flange 202. Thus, an outer peripheral surface of the raised portion 137 contacts a side surface of the recessed portion 207, and outward deformation of the suction port flange 130 in the radial direction is reduced by the exhaust port flange 202.

Note that in an example illustrated in FIGS. 10A, 10B, and 11, a fitting portion extends across the entire circumference of the suction port flange 130, but may be provided only at part of the suction port flange 130. For example, the recessed portion 207 and the raised portion 137 may be provided only in the region of the angle range B (the angle range with almost no bolts) illustrated in FIGS. 4A and 4B. With this configuration, a low impact resistance portion can be reinforced by the fitting portion.

Fourth Embodiment

As described above, when the impact force generated upon sudden pump stop is applied to the bolts 133 fixing the vacuum pump 1 to the second valve body 20B, great impact force is also applied to the second valve body 20B through the bolts 133. As a result, great shear stress acts on the bolts 133 (see FIG. 1) fixing the suction port flange 130. For this reason, in the second embodiment, the engagement member 30 illustrated in FIGS. 5A and 5B engages with both of the suction port flange 130 and the exhaust port flange 202. With this configuration, the load generated upon sudden stop is not only on the bolts 133 but also on the engagement member 30.

In the above-described first embodiment, the side wall W (see FIGS. 2 and 3) of the first valve body 20A positioned opposite to the second valve body 20B is set such that the distance r1 from the flange center axis is ½ (i.e., r1=OD1/2) of the outer diameter OD1 of the suction port flange 201. On the other hand, when the exhaust port flange 202 illustrated in FIG. 3 is viewed, the side wall W is positioned on the inside of the chain double-dashed line L1 indicating the outer shape of the VG300 flange. As a result, the width W1 of the suction port flange 201 within the angle range B is less than the width W2 of the VG300 equivalent flange, and the strength of the screw hole 204 portion within the angle range B is lower than that of the first valve body 20A on the right side of the angle range B as viewed in the figure.

Moreover, the number of bolts at normal VG300 is 12, but is a lower number, i.e., eight, in the first and second embodiments. Thus, if the impact force is equally on all bolts, the impact force per bolt is greater because the number of bolts is a lower number, i.e., eight. That is, it can be assumed that the impact force applied to internal thread portions screwed with the bolts 133 of the first valve body 20A is greater in a case where the number of bolts is eight.

Figure 14:
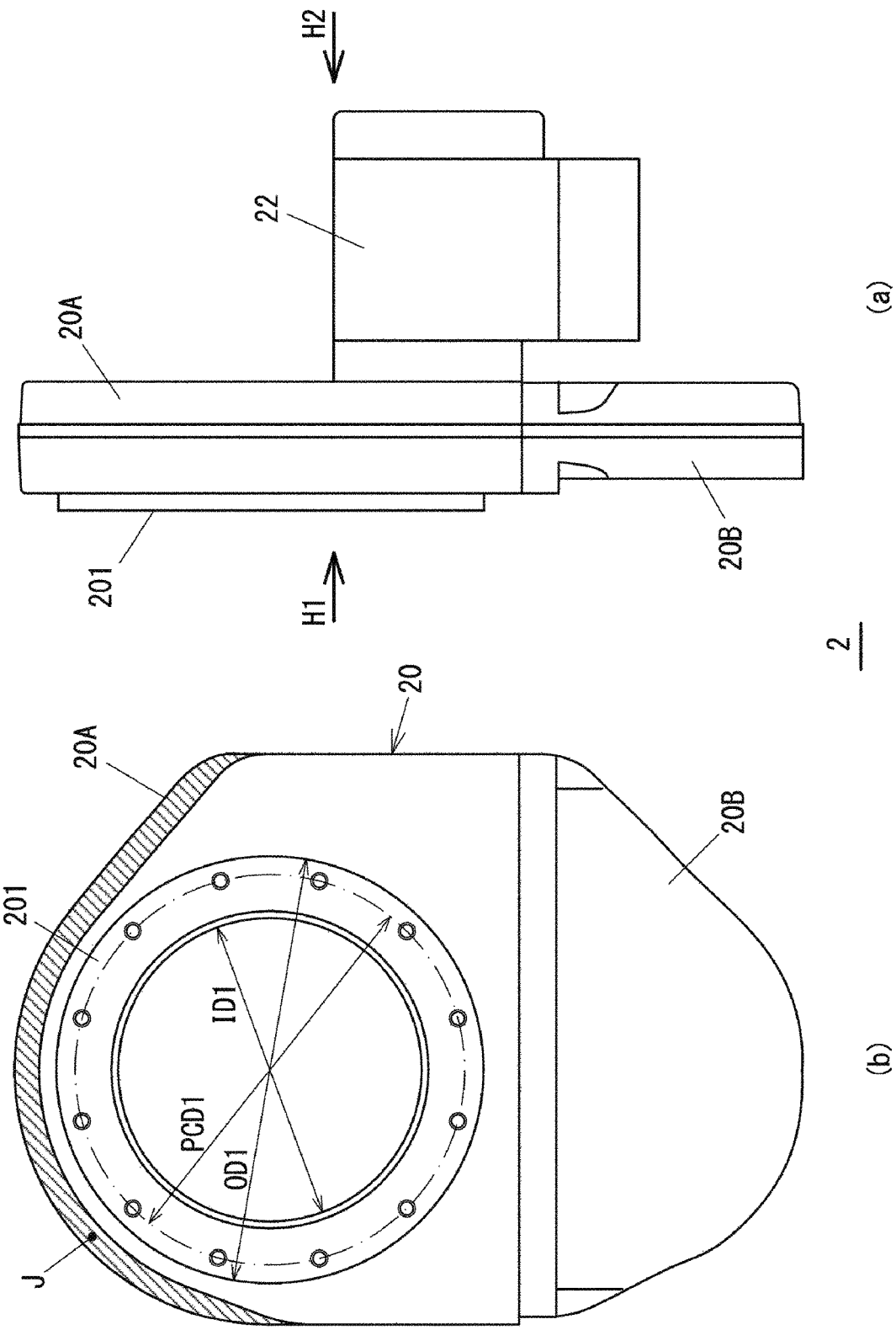
FIGS. 14A and 14B are views of a vacuum valve configuration in a fourth embodiment.
Figure 15:
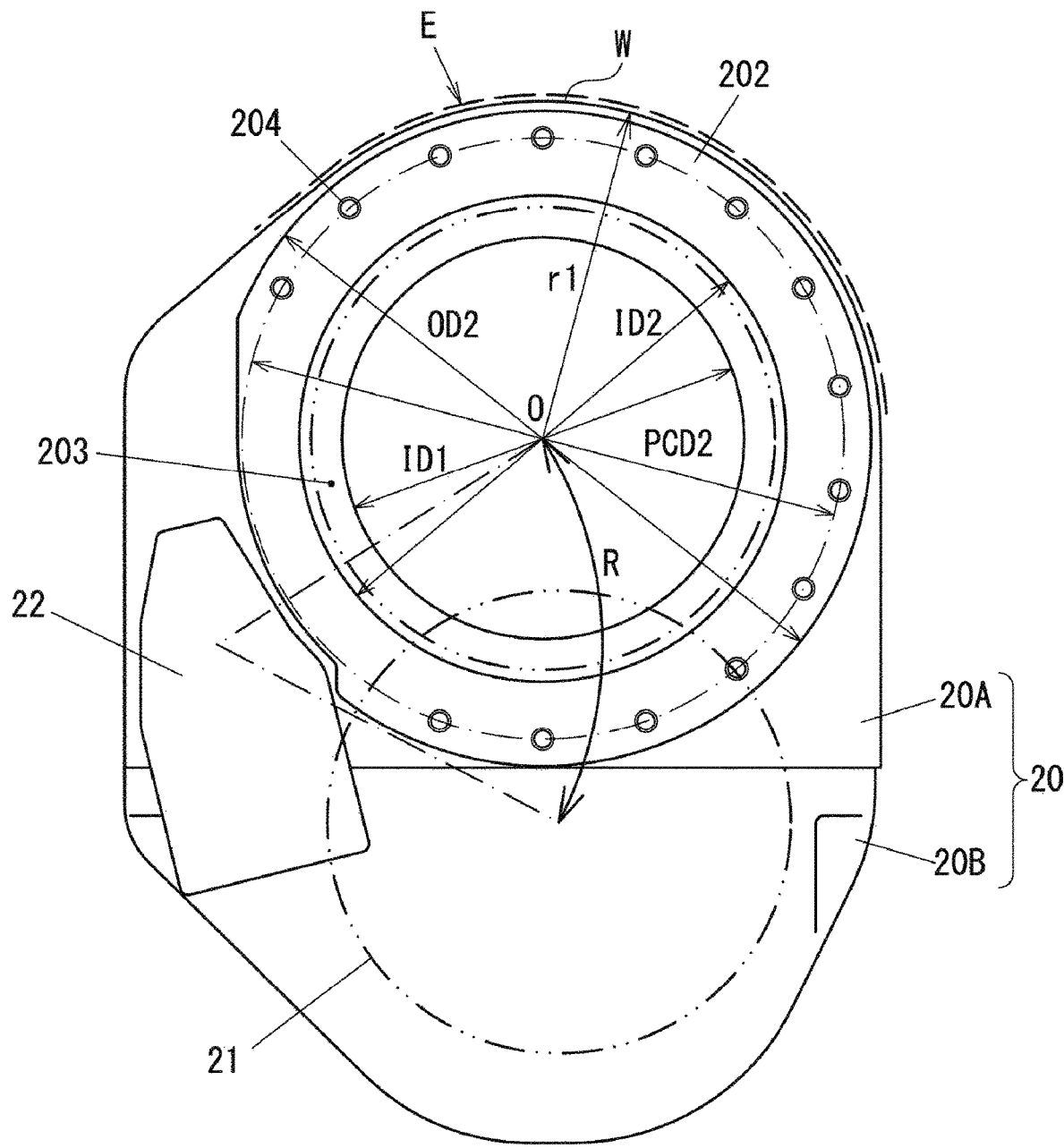
FIG. 15 is a view from an arrow H2 of FIG. 14A.

Thus, in a fourth embodiment, it is configured such that the strength of a first valve body 20A against impact force upon sudden pump stop is focused. FIGS. 14A, 14B, and 15 are views of the configuration of a vacuum valve 2 in the fourth embodiment. FIG. 14A is a side view of the vacuum valve 2, and FIG. 14B is a view of a suction port flange 201 side of the vacuum valve 2 from an arrow H1 of FIG. 14A. Note that the vacuum valve 2 illustrated in FIGS. 14A and 14B is larger than the vacuum valve 2A illustrated in FIG. 12 by a hatched region J as viewed in the plane. Moreover, FIG. 15 is a plan view of an exhaust port flange side of the vacuum valve 2 from an arrow H2 of FIG. 14A. Flanges 201, 202 are provided coaxially, and a valve plate 21 indicated by a chain double-dashed line in FIG. 15 is slidably driven to swing, as indicated by an arrow R, between a closed position (an opening degree of 0%) at which the valve plate 21 is arranged on the axes of the flanges 201, 202 and an open position (an opening degree of 100%) at which the valve plate 21 is retracted in the direction of a second valve body 20B from the center axes.

In the vacuum valve 2 illustrated in FIGS. 14A, 14B, and 15, the suction port flange 201 is, as in the case of the first embodiment, a VG250 equivalent (a nominal diameter of 250) flange, and the exhaust port flange 202 is a VG300 equivalent (a nominal diameter of 300) flange. An opening diameter (an inner diameter) on the suction port flange 201 side is ID1, and an opening diameter (an inner diameter) on an exhaust port flange 202 side is ID2 (>ID1). The suction port side with the opening diameter ID1 and the exhaust port side with the opening diameter ID2 are connected together through a tapered surface 203. As a result, valve conductance and an effective pumping speed of a vacuum pumping device can be improved as in the case of the first embodiment.

Further, as illustrated in FIG. 15, a side wall W (a side wall of a portion indicated by a broken line E) of the first valve body 20A positioned opposite to the second valve body 20B is set such that a distance r1 from a flange center axis O is minimized to such an extent that the VG300 equivalent exhaust port flange 202 can be formed. That is, the distance r1 is set to OD2/2 or a value slightly greater than OD2/2. Moreover, In the case of the VG300 equivalent flange, 12 M12 bolts are used as fixing bolts. However, in the present embodiment, 14 M12 bolts are used to provide the same level of bolt strength as that of the case of the first embodiment (using eight M16 bolts).

Note that for the exhaust port flange 202, part of the exhaust port flange 202 on the left side as viewed in the figure (see FIGS. 5A and 5B) is cut out to avoid contact of the exhaust port flange 202 with a motor case 22. Thus, screw holes 204 for bolt fixing are arranged to avoid a flange portion narrowed by cutout. Although not shown in the figure, the suction port flange on a vacuum pump side is also set to a shape in accordance with the exhaust port flange 202 as in the case of the first embodiment.

As described above, in the fourth embodiment, the number of bolts is greater than those in the first embodiment (using eight M16 bolts) and in a typical VG300 equivalent case (using 12 M12 bolts), and therefore, impact force on each bolt can be reduced. Further, the distance r1 from the flange center axis O to the side wall W of the region indicated by the broken line E of FIG. 15 is longer than that in the first embodiment (see FIGS. 2 and 3), and therefore, the strength of the portion with the screw holes 204 can be more improved as compared to the first embodiment. As a result, valve body breakage of the screw hole 204 portion upon sudden pump stop can be prevented.

Fifth Embodiment

Figure 16:
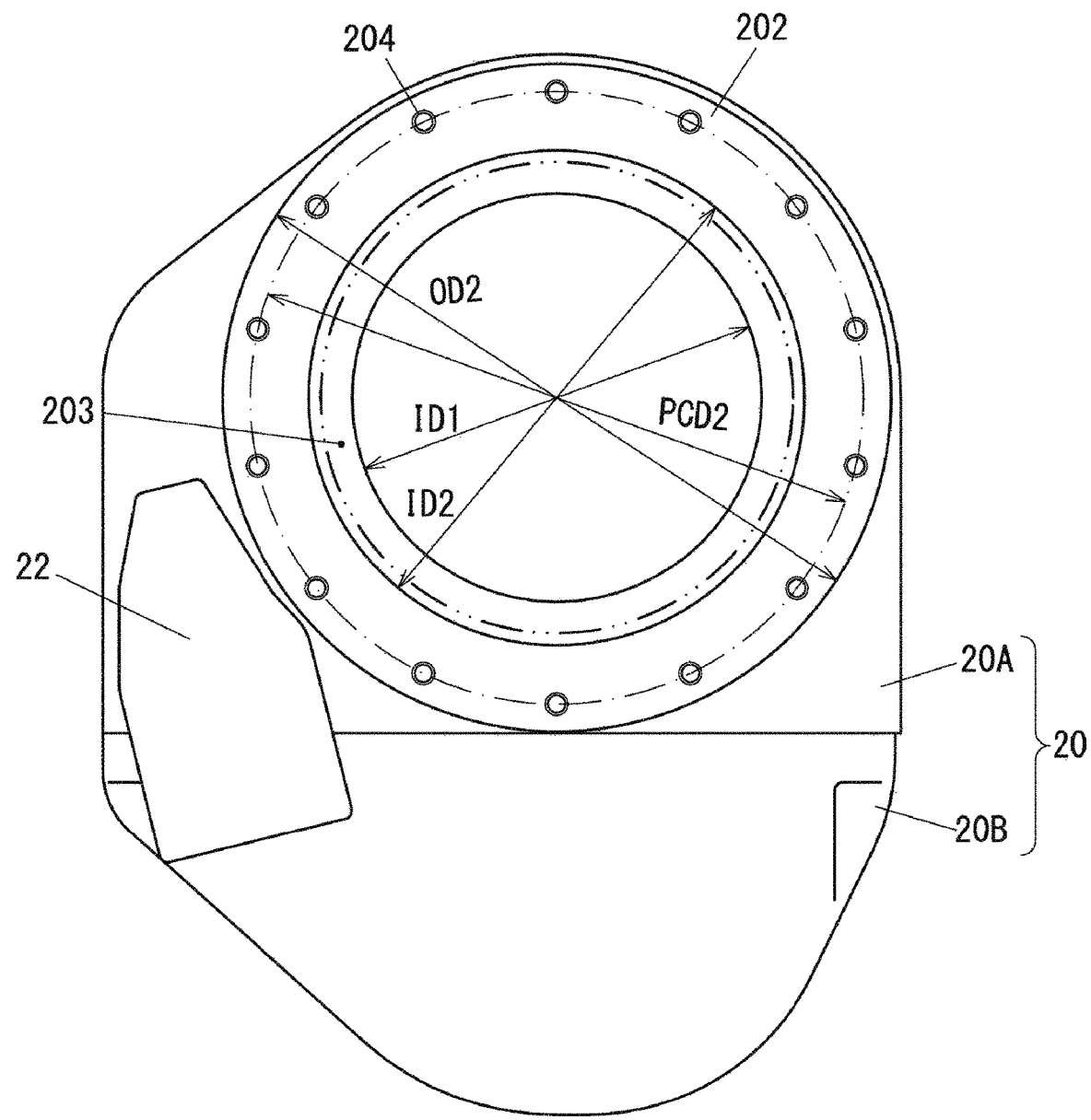
FIG. 16 is a view of a fifth embodiment.

FIG. 16 is a view of a fifth embodiment of the present invention. A vacuum valve 2 illustrated in FIG. 16 is configured such that for avoiding contact of a VG300 equivalent exhaust port flange 202 with a motor case 22, the width dimension of a first valve body 20A in the right-to-left direction as viewed in the figure is slightly increased and the position of the motor case 22 is changed in the left direction as viewed in the figure. Thus, as compared to the vacuum valve 2 illustrated in FIG. 15, the same longitudinal dimension in the upper-to-lower direction as viewed in the figure is applied, but a greater width dimension of a valve body 20 in the right-to-left direction as viewed in the figure is applied. That is, as in the case of the fourth embodiment, a distance r1 from a flange center axis O to a side wall W of the first valve body 20A is set to ½ of the outer diameter OD2 of the exhaust port flange 202 or a value slightly greater than ½.

As described above, the width dimension of the first valve body 20A is increased, and therefore, it is not necessary to cut out part of the exhaust port flange 202 as in the vacuum valve 2 illustrated in FIG. 15. Screw holes 204 are arranged at equal angular intervals across the circumference of the exhaust port flange 202. Note that in an example illustrated in FIG. 16, the number of screw holes 204 is 14. However, with spare bolt strength against impact force upon sudden pump stop, the number of screw holes 204 may be 12 as a VG300 equivalent flange standard.

As described above, the opening diameter ID2 of the exhaust port flange 202 is set greater than the opening diameter ID1 of a suction port flange 201, and the flow path sectional area of a gas flow path region FR is increased from a suction port flange 201 side to an exhaust port flange 202 side. With this configuration, an effective pumping speed at a suction port of the vacuum valve 2 can be easily improved.

In this state, in a case where the size of the vacuum valve 2 is suppressed to the same level of size as that of the general VG250 equivalent vacuum valve illustrated in FIG. 12, the distance r1 from the flange center axis O to the side wall W (i.e., the side wall positioned opposite to a second valve body 20B) of the first valve body 20A may be set to r1=OD1/2 as in the first embodiment. OD1 is the outer diameter of the suction port flange 201. In terms of more focusing on the strength of a screw hole 204 portion of the first valve body 20A, the same level of width dimension as the width dimension of a VG300 equivalent flange applied to the exhaust port flange 202 is preferably ensured for the first valve body 20A. With such settings, the same level of strength as that of the VG300 equivalent flange can be expected. In this case, the distance r1 from the flange center axis O to the side wall W of the first valve body 20A is set to r1=OD2/2 as in the fourth embodiment.

Needless to say, in the case of not requiring the same level of strength as that of the VG300 equivalent flange, the distance r1 (<OD2/2) may be set according to required strength. That is, in the vacuum valve 2 configured such that the opening diameter ID2 of the exhaust port flange 202 is set greater than the opening diameter ID1 of the suction port flange 201, the distance r1 from the flange center axis O to the side wall W of the first valve body 20A is, considering balance between the size and the strength, substantially set to a predetermined value within a range of OD1/2≤r1≤OD2/2. OD1 is the outer diameter of the suction port flange 201, and OD2 is the outer diameter of the exhaust port flange 202.

Note that r1<OD2/2 corresponds to a case where part of the outer diameter side of the exhaust port flange 202 is cut out as illustrated in FIG. 3. In this case, OD2 indicates the outer diameter of a VG300 flange as a flange standard applied to the exhaust port flange 202. Considering a case where the exhaust port flange 202 is partially cut out as described above, when an outer diameter according to a flange standard applied to the suction port flange 201 and the outer diameter according to the flange standard applied to the exhaust port flange 202 are each referred to as "flange outer diameters," a condition of OD1/2≤r1≤OD2/2 can be translated into equal to or greater than ½ of the outer diameter OD1 of the valve suction port flange 201 and equal to or less than ½ of the outer diameter OD2 of the valve exhaust port flange 202.

Various embodiments and variations have been described above, but the present invention is not limited to the contents of these embodiments and variations. For example, the vacuum pump 1 is not limited to the turbo-molecular pump, and may be vacuum pumps in other forms. Other aspects conceivable within the scope of the technical idea of the present invention are also included in the scope of the present invention.

What is claimed is:

1. A vacuum pumping device comprising:
a vacuum valve comprising:
a valve suction port flange provided at a valve body;
a valve exhaust port flange provided at the valve body and having a greater opening diameter than that of the valve suction port flange;
a gas flow path region provided in the valve body, and including an opening of the valve exhaust port flange and having a changing flow path sectional area;
a valve plate provided in the valve body and corresponding to the opening diameter of the valve suction port flange; and
a valve driver configured to slidably drive the valve plate between a closed position at which the valve plate is arranged within the gas flow path region on a center axis of the valve suction port flange and an opening position at which the valve plate is retracted from the center axis,
wherein in the gas flow path region, a flow path sectional area of an upstream region end is set to an opening sectional area of the valve suction port flange, and increases toward the opening of the valve exhaust port flange; and
a vacuum pump configured such that a pump suction port flange is bolted to the valve exhaust port flange,
wherein multiple bolts for bolting the pump suction port flange to the valve exhaust port flange are unevenly distributed in a predetermined angle region of an entire circumference of the pump suction port flange, and for the pump suction port flange and the valve exhaust port flange, a distance from a flange center axis to a flange outer-diameter-side end portion is set less in other angle regions than in the predetermined angle region.

2. The vacuum valve according to claim 1, wherein an opening of the valve suction port flange and the opening of the valve exhaust port flange are formed coaxially.

3. The vacuum valve according to claim 2, wherein the valve body has
a first body portion provided with the valve suction port flange and the valve exhaust port flange, and
a second body portion provided with a retraction region of the valve plate at the open position, and
a side wall of the first body portion positioned opposite to the second body portion is configured such that a distance from the center axis of the valve suction port flange to the side wall is set to a predetermined value within a range of equal to or greater than ½ of an outer diameter of the valve suction port flange and equal to or less than ½ of an outer diameter of the valve exhaust port flange.

4. The vacuum pumping device according to claim 1, wherein
the valve driver is fixed to the valve body in a vicinity of flange side walls of the pump suction port flange and the valve exhaust port flange in the predetermined angle region.

5. The vacuum pumping device according to claim 1, further comprising:
an engagement member having a first engagement portion engaging with the valve exhaust port flange and a second engagement portion engaging with the pump suction port flange, thereby reducing movement of the pump suction port flange in a circumferential direction.

6. The vacuum pumping device according to claim 1, wherein
the pump suction port flange has an engagement portion engaging with the valve exhaust port flange to reduce movement of the pump suction port flange in a circumferential direction.

7. The vacuum pumping device according to claim 1, wherein
a fitting portion fitting with the valve exhaust port flange to reduce deformation of the pump suction port flange in a radial direction is provided at the pump suction port flange.

8. The vacuum pumping device according to claim 7, wherein
the fitting portion is provided in a region of the entire circumference of the pump suction port flange other than the predetermined angle region.

9. A vacuum pump used for a vacuum pumping device including the vacuum pump and a vacuum valve, the vacuum valve including a valve suction port flange provided at a valve body; a valve exhaust port flange provided at the valve body and having a greater opening diameter than that of the valve suction port flange; a gas flow path region provided in the valve body, and including an opening of the valve exhaust port flange and having a changing flow path sectional area; a valve plate provided in the valve body and corresponding to the opening diameter of the valve suction port flange; a valve driver configured to slidably drive the valve plate between a closed position at which the valve plate is arranged within the gas flow path region on a center axis of the valve suction port flange and an opening position at which the valve plate is retracted from the center axis; and
wherein in the gas flow path region, a flow path sectional area of an upstream region end is set to an opening sectional area of the valve suction port flange, and increases toward the opening of the valve exhaust port flange, the vacuum pump configured such that a pump suction port flange is bolted to the valve exhaust port flange, wherein multiple bolts for bolting the pump suction port flange to the valve exhaust port flange are unevenly distributed in a predetermined angle region of an entire circumference of the pump suction port flange, and for the pump suction port flange and the valve exhaust port flange, a distance from a flange center axis to a flange outer-diameter-side end portion is set less in other angle regions than in the predetermined angle region.

10. A vacuum valve used for a vacuum pumping device including the vacuum valve and a vacuum pump, the vacuum pump being configured such that a pump section port flange is bolted to a valve exhaust port flange of the vacuum valve, the vacuum valve comprising:

a valve suction port flange provided at a valve body;

the valve exhaust port flange provided at the valve body and having a greater opening diameter than that of the valve suction port flange;

a gas flow path region provided in the valve body, and including an opening of the valve exhaust port flange and having a changing flow path sectional area;

a valve plate provided in the valve body and corresponding to the opening diameter of the valve suction port flange;

a valve driver configured to slidably drive the valve plate between a closed position at which the valve plate is arranged within the gas flow path region on a center axis of the valve suction port flange and an opening position at which the valve plate is retracted from the center axis; and wherein in the gas flow path region, a flow path sectional area of an upstream region end is set to an opening sectional area of the valve suction port flange, and increases toward the opening of the valve exhaust port flange, and wherein multiple bolts for bolting the pump suction port flange to the valve exhaust port flange are unevenly distributed in a predetermined angle region of an entire circumference of the pump suction port flange, and for the pump suction port flange and the valve exhaust port flange, a distance from a flange center axis to a flange outer-diameter-side end portion is set less in other angle regions than in the predetermined angle region.

* * * * *